(12) United States Patent
Endo et al.

(10) Patent No.: US 6,960,247 B2
(45) Date of Patent: Nov. 1, 2005

(54) CHROMIUM-FREE WATER REDUCIBLE RUST INHIBITIVE PAINT FOR METALS

(75) Inventors: Yasuhiko Endo, Yokohama (JP); Tomio Sakai, Nagoya (JP); Kengo Takase, Kasugai (JP)

(73) Assignee: Hoden Seimitsu Kako Kenkyusho Co., Ltd., Atsugi (JP)

( * ) Notice: Subject to any disclaimer, the term of this patent is extended or adjusted under 35 U.S.C. 154(b) by 7 days.

(21) Appl. No.: 10/894,294

(22) Filed: Jul. 20, 2004

(65) Prior Publication Data

US 2005/0027056 A1 Feb. 3, 2005

(30) Foreign Application Priority Data

Jul. 22, 2003 (JP) ......................................... 2003-277284
Dec. 12, 2003 (JP) ......................................... 2003-414208
Feb. 24, 2004 (JP) ......................................... 2004-047447

(51) Int. Cl.$^7$ .............................. C09D 5/10; C08K 3/08
(52) U.S. Cl. ................ 106/14.41; 106/14.12; 106/14.44; 428/447; 428/450; 428/457; 524/439; 524/441
(58) Field of Search .............................. 106/14.12, 14.41, 106/14.44; 428/447, 450, 457; 524/439, 441

(56) References Cited

U.S. PATENT DOCUMENTS

| | | |
|---|---|---|
| 3,907,608 A | 9/1975 | Barrett et al. |
| 4,891,394 A | 1/1990 | Savin |
| 5,868,819 A | 2/1999 | Guhde et al. |
| 6,270,884 B1 * | 8/2001 | Guhde et al. ............... 428/323 |

FOREIGN PATENT DOCUMENTS

| | | | |
|---|---|---|---|
| DE | 2831269 A1 | * | 1/1980 |
| EP | 0 939 111 A1 | | 9/1999 |
| EP | 1 199 339 A1 | | 4/2002 |
| EP | 1 233 043 A2 | | 8/2002 |
| JP | 53-016044 | | 2/1978 |
| JP | 4-53716 A | * | 2/1992 |
| JP | 06-041472 | | 2/1994 |
| JP | 06-009897 | | 1/1997 |
| JP | 10-046058 | | 2/1998 |
| JP | 2001-64782 | | 3/2001 |
| JP | 2002-121485 | | 4/2002 |
| JP | 2003-3271 | | 1/2003 |

* cited by examiner

Primary Examiner—Anthony J. Green
(74) Attorney, Agent, or Firm—Sughrue Mion, PLLC

(57) ABSTRACT

Provided is a chromium-free rust inhibitive paint for metals which is obtained by mixing a flaky zinc powder into a water reducible binder solution containing a water reducible resin emulsion and a water soluble silane coupling agent. A thin film of a silane compound having a hydrophobic group is added to particle surfaces of the flaky zinc powder, whereby the flaky metallic zinc powder exhibits water repellent property. When a surface treatment agent which contains an alkoxysilane oligomer as an essential component is applied to the paint film of a rust inhibitive paint for metals, this extends the time until red rusting occurs on painted metal products to not less than twice and prevents white rusting and black rusting for a long time. Rust inhibitive performance is further improved by blending a nano-sized powder of titanium dioxide, polyvinyl butyral, a silane coupling agent, etc., with the surface treatment agent.

20 Claims, 1 Drawing Sheet

CHROMIUM-FREE WATER REDUCIBLE RUST INHIBITIVE PAINT FOR METALS

BACKGROUND OF THE INVENTION

1. Field of the Invention

The present invention relates to a chromium-free water reducible rust inhibitive paint for metals to protect the surfaces of ferrous metals, such as steel and pig iron, from rusting.

2. Description of the Related Art

As rust inhibitive paints for metals, those which contain, as a rust inhibitive pigment, a metallic zinc powder and a metallic aluminum powder, which exhibit the sacrificial corrosion inhibitive effect because of their greater ionization tendency than the main components of a substrate, such as iron, are well known, and a zinc rich paint is an example. Rust inhibitive paints for metals are classified into products which use an organic solvent, such as alcohol, and water reducible products which can be diluted with water. A chromic acid component (hexavalent chromium) is blended in a conventional water reducible binder solution of rust inhibitive paint for metals, for example, as in the water reducible rust inhibitive paint disclosed in U.S. Pat. No. 3,907,608.

This chromic acid component remarkably enhances the rust inhibitive performance by the sacrificial corrosion inhibitive effect of a rust inhibitive paint film by imparting the self-repair function to the rust inhibitive paint film and, at the same time, works as an inhibitor which forms a stable chemical film on particle surfaces of a metallic zinc powder and a metallic aluminum powder which are dispersed in an aqueous binder solution, thereby preventing reactions which occur between the aqueous binder solution and the metal powders. Therefore, a water reducible rust inhibitive paint for metals which contain chromic acid (hexavalent chromium) is excellent in rust inhibitive performance and has a long pot life.

In recent years, because the hexavalent chromium component has toxicity and carcinogenicity, a water reducible rust inhibitive paint for metals which contains a trivalent chromium component or a chromium-free water reducible rust inhibitive paint for metals which does not contain a trivalent chromium component capable of changing to hexavalent chromium has been desired, and several chromium-free water reducible rust inhibitive paints for metals have been proposed.

All of these water reducible rust inhibitive paints for metals which do not contain the chromic acid component are inferior in rust inhibitive performance to water reducible rust inhibitive paints for metals which contain the chromic acid component. Water reducible rust inhibitive paints for metals which do not contain the chromic acid component have such a problem that they are deficient in the self-repair function when a paint film is damaged, and when the aqueous binder solution is weakly acid or weakly alkaline, the metallic zinc powder and the metallic aluminum powder react with the water of the aqueous binder solution and generate hydrogen gas. When hydrogen gas is generated in a paint, traces of hydrogen bubbles remain in the formed paint film. The reaction increases viscosity to shorten the pot life of the rust inhibitive paint and impair the rust inhibitive performance.

In Japanese Laid-Open Patent JP 53-16044 A, there is disclosed, as a chromium-free water reducible rust inhibitive paint for metals, a rust inhibitive paint (a zinc rich paint) in which a metallic zinc powder is combined with an aqueous binder solution which is essentially composed of an organosilane-containing resin obtained by reacting organo-functional silane (including a water soluble silane coupling agent) with an organic resin, an organic silicate such as ethyl silicate, a high boiling point organic solvent such as etyl Cellosolve, and water.

Japanese Laid-Open Patent JP 6-41472 A discloses a corrosion inhibitive agent in which an almost neutral aqueous solution of the binder (pH=7) is prepared, using a water soluble synthetic resin essentially composed of a polymer containing $\alpha$-$\beta$ unsaturated fatty acid salts as a binder, and a rust inhibitive agent for metals is added as an inhibitor instead of chromic acid component.

U.S. Pat. No. 5,868,819 discloses an organic-solvent-based rust inhibitive paint which is essentially composed of a zinc powder, an epoxy resin, an epoxy-type silane coupling agent and a thermally expansible powder (a microcapsule powder in which a low boiling point hydrocarbon is enveloped in a solvent resistant shell wall).

Furthermore, there is a water reducible rust inhibitive paint for metals which is disclosed in Japanese Laid-Open Patent JP 10-46058 A. In this rust inhibitive paint for metals, a water soluble silane compound (a water soluble silane coupling agent) is used as a binder, and the paint contains a metallic zinc powder and a high boiling point organic liquid. Also, there is disclosed in the patent a metal product in which the painted surface is top coated with a silicious film in order to improve rust inhibitive performance.

Silicates (organic and inorganic) and colloidal silicas (water-based and solvent-based) are mentioned as the silicious substance, and alkyl silicates such as ethyl silicate are mentioned as the organic silicates. Japanese Laid-Open Patent JP 2002-121485 A discloses a water reducible rust inhibitive paint for metals in which an organic solvent having a boiling point of less than 100° C. is contained and which does not contain any organic resin. Also, there is disclosed a painted product having a top-coat of a silicious substance.

Japanese Laid-Open Patent JP 2001-64782 A discloses a rust inhibitive coating method which comprises forming an oxide film of Si, Al or Ti on a hot-dipped galvanized surface by the sol-gel process. In an example of the patent specification, a specimen is immersed in an alkoxide solution in a sol state (an alcoholic solution of a condensation polymerized alkoxysilane product which is obtained by mixing water and hydrochloric acid in an alcoholic solution of tetraethoxysilane), pulled up, dried and baked, thereby forming a silicious coating. However, in a salt spray test, white rusting occurred in a short time of not more than 12 hours and a rust inhibitive performance was not good.

Japanese Laid-Open Patent JP 6-9897 A discloses a technique which comprises immersing a metallic zinc flake in an aqueous colloidal silica solution, and forming a silica film on the surface of the metallic zinc flake thereby to prevent the metallic zinc flake from reacting with water. However, because the metallic zinc flake powder coated with an aqueous colloidal silica is apt to develop white rusting, the film is inadequate to prevent the reaction with an aqueous binder solution.

Japanese Laid-Open Patent JP 2003-3271 A discloses a corrosion inhibitive coating composition in which a metal powder surface-coated with a fatty acid, such as stearic acid, is used as a rust inhibitive pigment of a water reducible rust inhibitive paint for metals.

Conventionally, a flaky metallic zinc powder of a rust inhibitive pigment to be blended in a water reducible rust inhibitive paint for metals is protected by coating the surface of the metallic zinc powder with a fatty acid such as stearic acid or a higher alcohol such as lauryl alcohol in order to suppress reactions between the flaky metallic zinc powder and an aqueous binder solution. Specifically, a fatty acid or a higher alcohol is dissolved as a lubricant in an organic medium for flaking a metallic zinc powder to which a metallic aluminum powder can be mixed, the organic medium is removed by evaporating after this flaking processing, and stearic acid or lauryl alcohol is left on the surface of the flaky metallic zinc powder. In this coating method, however, stearic acid or lauryl alcohol works also as an adhesive to particles of the flaky metallic zinc powder and converts the flaky metallic zinc powder into secondary particles. Once secondary particles of a flaky metallic zinc powder are formed, it is difficult to disintegrate the secondary particles into primary particles again. If a paint is formed utilizing the flaky metallic zinc powder and goods are painted with the paint, the structure of secondary particles of the flaky metallic zinc powder remains in the coating, and it is difficult to form a thin coating which is excellent in rust inhibitive performance. It is possible to disintegrate secondary particles into primary particles by using, for example, a jet mill as means for disintegrating the secondary particles into primary particles. However, upon disintegrating into primary particles, the flaky metallic zinc particles are broken into fine pieces or the coating on the flaky particle surfaces is damaged. If a flaky metallic zinc powder which has been disintegrated into primary particles by such a method is dispersed in an aqueous binder solution to which a surfactant is added and a paint is formed, the flaky metallic zinc powder reacts with the aqueous binder solution to form hydrogen bubbles, the viscosity of the paint increases gradually and finally gelation occurs, thereby posing the problem that the pot life of the rust inhibitive paint is short.

Metal products which are painted with a conventional chromium-free rust inhibitive paint and metal products coated with the chromium-free rust inhibitive paint film and a top-coat on the painted film are inferior in rust inhibitive performance to metal products coated with a rust inhibitive paint film containing a chromium component. Therefore, a thin paint film suitable for the painting of fasteners such as bolts has a poor rust inhibitive performance, and white rusting and black rusting occur in a short time even if red rusting can be prevented to some extent.

SUMMARY OF THE INVENTION

By conducting research aimed at a rust inhibitive paint which solves these problems, the present inventors have reached the present invention, that is, a developed rust inhibitive paint exhibits a good rust inhibitive performance and can suppress white rusting and black rusting for a long time even in metal products having a thin paint film suitable for the painting of fasteners and metal products having a thin paint film top-coated with a chromium-free surface treatment agent.

That is, the present invention has as its object to provide a chromium-free water reducible rust inhibitive paint for metals which has a good rust inhibitive performance even with a relatively thin rust inhibitive paint film and can suppress white rusting and black rusting for a long time.

The present invention has another object to provide a chromium-free water reducible rust inhibitive paint for metals which contains a rust inhibitive pigment exhibiting the sacrificial corrosion inhibitive effect. The pigment is a flaky zinc powder on which is formed a coating to prevent reactions between the water reducible binder solution and the flaky zinc powder and does not cause to form secondary particles.

The present invention has a further object to provide a metal product having a relatively thin rust inhibitive paint film covered with a rust inhibitive coating and has rust inhibitive performance capable to suppress white rusting and black rusting for a long time.

A chromium-free water reducible rust inhibitive paint for metals of the present invention consists essentially of a water reducible binder solution and 10 to 60% by weight of a flaky zinc powder dispersed as a rust inhibitive pigment, including an effective amount of flaky aluminum powder, and the water reducible binder solution contains, per 100 parts by weight of flaky zinc powder, 0.4 to 5 parts by weight of water reducible resin emulsion as an amount converted to a resin component and 2 to 60 parts by weight of water soluble silane coupling agent as an effective component amount.

The chromium-free water reducible rust inhibitive paint for metals of the present invention preferably contains 15 to 55% by weight of the flaky zinc powder and further contains, per 100 parts by weight of flaky zinc powder, 0.5 to 4.5 parts by weight of water reducible resin emulsion as an amount converted to a resin component and 2.5 to 55 parts by weight of the water soluble silane coupling agent as an effective component amount.

The water reducible resin emulsion is preferably a water reducible epoxy resin emulsion or a water reducible block isocyanate resin emulsion. And it is preferred that the water soluble silane coupling agent have a glycidoxy-functional group.

In a chromium-free water reducible rust inhibitive paint for metals of the present invention, it is preferred that the water reducible binder solution contain 8 to 45% by weight of polyethylene glycol, which is a solid at ambient temperatures.

It is preferred that the flaky zinc powder contained in a chromium-free water reducible rust inhibitive paint for metals of the present invention be a mixture containing 5 to 30% by weight of flaky aluminum powder.

It is preferred that flaky zinc powder treated with silane compound having a hydrophobic group is dispersed in a chromium-free water reducible rust inhibitive paint for metals of the present invention. And it is preferred that the silane compound having a hydrophobic group which is to be added has a hydroxyl group being generated by the hydrolysis of alkoxy groups of the silane compound having the hydrophobic group and the alkoxy groups. It is preferred that the flaky zinc powder, to which surface a silane compound having a hydrophobic group is added, floats on a water surface even when a surfactant is not added to the water.

It is preferred that the flaky metallic zinc powder mixed in a chromium-free water reducible rust inhibitive paint for metals of the present invention exhibits water repellency due to the addition of a silane compound having a hydrophobic group to particle surfaces of the flaky zinc powder, and that the water reducible binder solution of the chromium-free water reducible rust inhibitive paint for metals contains an effective amount of surfactant capable of wetting the flaky zinc powder.

It is preferred that the flaky zinc powder be a mixture containing 5 to 30% by weight of flaky aluminum powder.

A rust inhibitive painted metal product according to the present invention has a paint film on a steel product surface containing iron as a main component, the paint film being formed by painting with a chromium-free water reducible rust inhibitive paint for metals, which consists essentially of a water reducible binder solution and 10 to 60% by weight of a flaky zinc powder dispersed as a rust inhibitive pigment in the water reducible binder solution, including an effective amount of flaky aluminum powder, and the water reducible binder solution contains, per 100 parts by weight of flaky zinc powder, 0.4 to 5 parts by weight of water reducible resin emulsion as an amount converted to a resin component and 2 to 60 parts by weight of water soluble silane coupling agent as an effective component amount.

It is preferred that in the rust inhibitive painted metal product according to the present invention, the paint film formed by painting with the above-described chromium-free water reducible rust inhibitive paint for metals has a top-coating formed by applying a chromium-free surface treatment agent which contains, as a main component, alkoxy silane oligomer of weight averaged molecular weight (Mw) of 1000 to 10000, which is obtained by the hydrolytic condensation polymerization of alkoxysilane by use of alcohols as a solvent.

It is preferred that in the rust inhibitive painted metal product according to the present invention, the chromium-free surface treatment agent which forms a top-coating on the paint film formed by painting with the above-described chromium-free water reducible rust inhibitive paint for metals contains an effective amount of dispersed nano-sized powder of titanium dioxide which is formed of primary particles having average particle size of not more than 70 nm. Furthermore, it is preferred that the chromium-free surface treatment agent contains a resin component soluble in alcohols. It is preferred that the chromium-free surface treatment agent contains not less than 5% but not more than 35% of alcohols having a boiling point higher than 115° C. It is preferred that the chromium-free surface treatment agent contains 8 to 25% by weight of alkoxy silane oligomer as an amount converted to a silica component.

It is preferred that in the rust inhibitive painted metal product according to the present invention, the average film thickness of a paint film formed by painting with the above-described chromium-free water reducible rust inhibitive paint for metals is 4 to 25 μm and the average thickness of the top-coating of the chromium-free surface treatment agent is 1 to 3 μm.

As will be specifically described below by giving examples, in the chromium-free water reducible rust inhibitive paint for metals of the present invention, due to combined use of a water reducible resin emulsion and a water soluble silane coupling agent in a binder, it is possible to form a rust inhibitive paint film which exhibits excellent rust inhibitive performance in adhesion and film strength even when the thickness of the paint film is as thin as less than 20 μm. Furthermore, if the thickness of the paint film can be reduced to below 20 μm, it is possible to perform painting without exerting an unfavorable effect on the screw portions of fasteners, for example, bolts and nuts and it is possible to lower the temperature for baking to not more than 250° C. Therefore, even when fasteners have been subjected to heat treatment, it is possible to avoid an effect of tempering.

Furthermore, it is needless to say that because a chromium-free water reducible rust inhibitive paint for metals of the present invention does not contain a chromium component, there is no need to worry about the environmental pollution by a chromium component and that because the paint is water reducible, the volatilization of volatile organic compound (VOC) during use is small.

In addition, the chromium-free water reducible rust inhibitive paint for metals of the present invention can prevent red rusting for a long time and can also prevent white rusting and black rusting. In particular, addition of a silane compound having a hydrophobic group to the particle surface of a flaky metallic zinc powder enables to prevent the flaky metallic zinc powder from forming secondary particles. Then, the film structure of the rust inhibitive paint is remarkably improved and it is possible to achieve excellent rust inhibitive performance with a thin rust inhibitive paint film.

Furthermore, because flaky zinc powder particles are covered with a coating of a silane compound having a hydrophobic group, hydrogen bubbles caused by a reaction between the flaky zinc powder and an aqueous binder solution scarcely occur when a paint is formed, and it is possible to form a paint film without any traces of hydrogen bubbles.

Because the reaction which generates hydrogen is suppressed, the viscosity of the paint does not easily increase and the pot life of the paint is improved. Also, because the particles of a flaky zinc powder are covered with a non-adhesive coating of a silane compound, it is possible to prevent the particles of a flaky zinc powder from coalescing together to form secondary particles or even when the particles have become secondary particles, the secondary particles can be easily disintegrated into primary particles by stirring. In this manner, the particles of a flaky zinc powder are dispersed substantially in the form of primary particles in a water reducible binder solution. Therefore, in a paint film obtained by painting the water reducible rust inhibitive paint for metals on an article, a lamellar structure in which the particles of a flaky zinc powder overlap each other in a condition shifted parallel to each other is formed, and only with a thin paint film of about 10 μm, it is possible to ensure rust inhibitive performance exceeding 1000 hours in the salt spray test.

Applying a chromium-free surface treatment agent made from an alcoholic solution of alkoxysilane oligomer having a specific weight averaged molecular weight onto a rust inhibitive paint film remarkably improves rust inhibitive performance. Furthermore, blending a nano-sized powder of titanium dioxide to this chromium-free surface treatment agent clearly improves rust inhibitive performance. Furthermore, rust inhibitive performance can be further improved by dissolving a resin which is soluble in alcohol in the surface treatment agent. In this case, if a silane coupling agent is used in combination, the dispersion condition of a nano-sized powder of titanium dioxide is improved and this also improves the adhesion of a coating.

When this chromium-free surface treatment agent is applied onto a paint film of a water reducible rust inhibitive paint on an article to form a coating having a thickness of about 2 μm, it is possible to form a paint film having rust inhibitive performance exceeding 2000 hours in the salt spray test. Therefore, it is possible to provide a chromium-free water reducible rust inhibitive paint for metals which is suitable for rust inhibitive painting of fasteners such as bolts and has rust inhibitive performance exceeding 2000 hours in the slat spray test even when the film thickness is 10 μm or below in total.

In consideration of the fact that, when the thickness of a paint film of a rust inhibitive paint is increased to twice, the rust inhibitive performance in the salt spray test is improved about four times, the rust inhibitive performance of a chromium-free water reducible rust inhibitive paint for metals according to the present invention is remarkably improved. Also, by applying a chromium-free surface treatment agent onto a paint film of a rust inhibitive paint, it is possible to form a chromium-free rust inhibitive paint film capable of suppressing white rusting and black rusting for a long time.

DETAILED DESCRIPTION OF THE PREFERRED EMBODIMENTS

Figure 1:
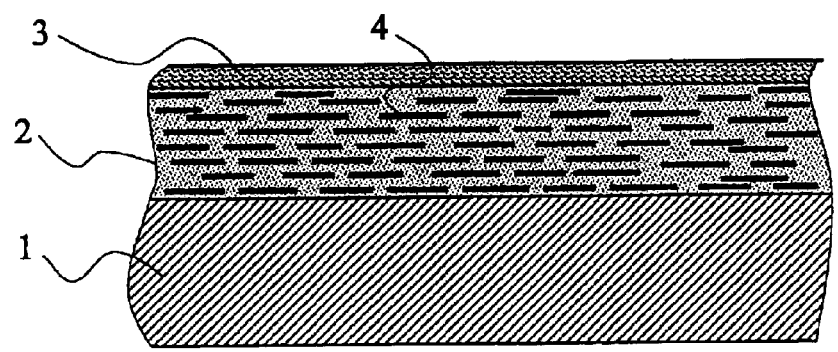
FIG. 1 is a schematic drawing showing the section of an improved paint film structure which is obtained by painting a water reducible rust inhibitive paint for metals which contains, as a rust inhibitive pigment, a flaky zinc powder to which surface a silane compound having a hydrophobic group is added, and top-coated with a chromium-free surface treatment agent of the present invention.

An improved chromium-free rust inhibitive paint, in which a water reducible resin emulsion combined with a water soluble silane coupling agent is used as a binder and a flaky zinc powder is contained, is proposed. With the proposed chromium-free rust inhibitive paint, it is possible to ensure effective rust inhibitive performance and adhesion even when the thickness of a paint film applied to a ferrous substrate is relatively small and to improve the stability (greatly influencing its pot life) of a prepared rust inhibitive paint for metals by forming a water reducible rust inhibitive paint for metals in which a flaky zinc powder, to which surface a silane compound having a hydrophobic group is added, is mixed. In this case, by dispersing flaky zinc particles in the paint, a paint film structure in which the flaky particles of a flaky zinc powder are overlapped and oriented parallel to the substrate surface is formed and it is possible to coat the substrate surface with the rust inhibitive pigment without a gap even the paint film thickness is small, making it possible to provide better rust inhibitive performance.

It is preferred that the average particle size of a flaky zinc powder is 0.3 to 1 μm in average thickness and 4 to 25 μm in average diameter. It is preferred that the average particle size of a flaky aluminum powder is 0.2 to 1 μm in average thickness and 4 to 25 μm in average diameter.

If the mixed amount of flaky zinc powder in the rust inhibitive paint is too large, the fluidity of the paint is impaired and paintability is poor. Therefore, this mixed amount should be not more than 60% by weight. Because if this mixed amount is too small, rust inhibitive performance is impaired, it should be not less than 10% by weight. The mixed amount of flaky zinc powder is preferably 15 to 55% by weight and more preferably 20 to 50% by weight.

For the preparation of a flaky zinc powder, a granular metallic zinc powder usually having an average particle size of several micrometers is used and dispersed in an inactive medium, such as mineral spirit and kerosene, to form a slurry having a solid content of about 30% by weight, and the slurry is processed by a bead mill. It is preferred that an aluminum paste is mixed in the slurry before when the slurry is processed by the bead mill.

When a higher fatty acid, a higher aliphatic alcohol, a high melting point paraffin, an antioxidant and the like are added to an inactive medium, it is possible to prevent the oxidation of surfaces of these flaky metal particles during drying.

When a water reducible resin emulsion and a water soluble silane coupling agent are used as binders, it is preferred to choose an appropriate blending ratio and amounts of both with which the effect of combined use can be obtained.

The blending amount of the water reducible resin emulsion is preferably 0.4 to 5 parts by weight and more preferably 0.5 to 4.5 parts by weight per 100 parts by weight of flaky zinc powder as an amount converted to a solid resin component. The blending amount of the water soluble silane coupling agent is preferably 2 to 60 parts by weight and more preferably 2.5 to 55 parts by weight per 100 parts by weight of flaky zinc powder.

If the amount of blended binder is too small, the adhesion to a substrate and the strength of a paint film decrease. If this amount is too large, the proportion of a flaky zinc powder in a paint film decreases and the contact between the particles of a zinc flaky powder becomes poor. As a result, because the metal powder in the paint film decrease, the rust inhibitive performance by the sacrificial corrosion inhibitive effect is impaired and the long-range rust inhibitive performance of the paint film decreases.

Water reducible resin emulsions capable of being used as the binder include a water reducible acrylic resin emulsion, a water reducible copolymer nylon resin emulsion, a water reducible epoxy resin emulsion, a water reducible vinyl acetate resin emulation, a water reducible polyester resin emulsion, a water reducible phenol resin emulsion, a water reducible urethane resin emulsion, a water reducible block isocyanate resin emulsion, a water reducible acrylic-silicon resin emulsion, a polyisoprene latex, and those obtained by mixing two kinds or more of them.

By using a water reducible resin emulsion and a water soluble silane coupling agent in combination as the binders, it is possible to remarkably improve the rust inhibitive performance of a paint film compared to a case where either of the binders is singly used.

It is preferred that the average particle size of an emulsified resin is as fine as not more than 1 μm, which ensures a stable emulsion. In order to ensure that a resin can be baked at a heat treatment temperature of not more than 250° C., it is desirable to select a resin having a melting point in the range of 190 to 250° C. and preferably in the range of 200 to 230° C.

It is desirable to use a water reducible epoxy resin emulsion or a water reducible block isocyanate resin emulsion as the water reducible resin emulsion, and the use of a water reducible epoxy resin emulsion or a water reducible block isocyanate resin emulsion is favorable for increasing the adhesion of a rust inhibitive paint film to a substrate thereby to ensure rust inhibitive performance.

Water soluble silane coupling agents capable of being used as a binder include β-(3,4-epoxycyclohexyl)ethyl trimethoxysilane, 4-(trimethoxysilyl) butane-1,2-epoxide, γ-glycidoxypropyl trimethoxysilane, β-(3,4-epoxycyclohexyl) ethyl triethoxysilane, etc. and it is also possible to use these water soluble silane coupling agents by mixing together. When a water reducible resin emulsion and a silane coupling agent are used in combination as the water reducible binders, it seems that the silylation of the resin component by the silane coupling agent occurs, and it might be thought that this forms a stable water reducible binder.

It is preferred that in particular, a compound which has a glycidoxy group as a functional group is used as the water soluble silane coupling agent. A silane coupling agent having a glycidoxy group as a functional group has a good affinity for a water reducible epoxy resin emulsion, and a rust inhibitive paint is obtained in which degradation, such as an increase in viscosity or gelation, does not easily proceed even a long time lapses after preparation. Combined use of such a silane coupling agent and a resin emulsion gives good adhesion to a paint film, and a paint film excellent in film strength can be formed. There are water soluble silane coupling agents which are emulsified when dissolved in water. Water soluble silane coupling agents of this type can be used without a problem and the use of these water soluble silane coupling agents is desirable because paint compositions excellent in stability are obtained.

Also, it is estimated that a water soluble silane coupling agent forms a thin protective film on the surfaces of flaky zinc powder particles, thereby suppressing reactions between the flaky zinc powder particles and the aqueous binder solution (to generate hydrogen). When a silane coupling agent having a glycidoxy-functional group is used, the pH of the aqueous binder solution stays at about 7, thus providing an advantage that the metallic zinc powder is less apt to react with the aqueous binder solution.

It is possible to use a flaky aluminum powder which is commercially available as an aluminum paste. Usually, an aluminum paste is mixed during the preparation of a paint. However, if part of the aluminum paste is mixed into a slurry during the processing of a zinc powder by a bead mill, it is possible to closely mix the flaky zinc powder and the flaky aluminum powder and the rust inhibitive performance of the paint is improved.

If part of the flaky zinc powder in a paint is replaced with the flaky aluminum powder, there is a tendency to form a layer rich in flaky aluminum powder in the subsurface portion of the paint film, with the result that the rust inhibitive performance of the paint film is improved and, at the same time, the rust inhibitive effect of the paint film lasts for a long time, making it possible to give the paint film a beautiful silver luster.

The ratio of the flaky aluminum powder which replaces the flaky zinc powder is preferably 5 to 30% by weight and more preferably 8 to 25% by weight of the flaky zinc powder.

In addition to the above-described components, usually, a surfactant which makes the substrate wettable by water, a thickener which adjusts viscosity, glycols, alcohols, an inhibitor, etc. are blended as required in the water reducible binder solution of a water reducible rust inhibitive paint for metals.

As a glycol to be blended in the water reducible binder solution, polyethylene glycol which is a solid at room temperature is preferably used and 8 to 45% by weight of polyethylene glycol is blended in the aqueous binder solution. Polyethylene glycol is a solid at room temperature when its molecular weight is not less than 1000 or so. Solid polyethylene glycol works also as a stable thickener and exhibits deliquescenece in the humid air. Therefore, when solid polyethylene glycol is blended in the water reducible binder solution of a water reducible rust inhibitive paint for metals, it suppresses the evaporation of the water in the paint. Accordingly, solid polyethylene glycol can keep stable viscosity for a long time during the use of a water reducible rust inhibitive paint for metals. The more preferred amount of blended solid polyethylene glycol is 10 to 40% by weight.

The addition of a surfactant is necessary for dispersing a water repellent flaky zinc powder in a water reducible binder solution. As the surfactant it is desirable to use nonionic surfactants such as polyoxyethylene nonyl phenylether, polyoxyethylene oleylether, polyoxyethylene stearyl ether and polypropylene glycol ether. In this case, it is desirable to select surfactants having an HLB (hydophile-lipophile balance) value of not less than 7 but less than 18. It is desirable to add a water soluble organic solvent and the like which works in conjunction with a surfactant to improve the dispersion of the flaky zinc powder in a rust inhibitive paint. These water soluble organic solvents include propyl alcohol, butyl alcohol, ethylene glycol, glycerin, ethyl Cellosolve, ethyl carbitol, dipropylene glycol, etc., and it is also possible to add polyethylene glycol which is a solid at room temperature and the like, this water soluble organic solid serves also as a thickener.

It is possible to add a solution of aqueous thickener, such as carboxymethyl cellulose and hydroxylethyl cellulose, which adjusts the viscosity, to the water reducible binder solution of a chromium-free rust inhibitive paint, to add a disinfectant which prevents the putrefaction such as isothiazoline-based compounds and the like to the water reducible binder solution, or to add a component which adjust pH, such as boric acid, to the water reducible binder solution.

It is preferred that the particle surfaces of a flaky zinc powder used in a chromium-free rust inhibitive paint for metals of the present invention is covered with a silane compound having a hydrophobic group. A silane compound having a hydrophobic group is present on the surfaces of flaky zinc powder particles as a very thin coating layer, which is less apt to adhere to each other compared to a film formed from a fatty acid or a higher alcohol, and has a weak force to convert flaky zinc powder particles to secondary particles. Therefore, even when flaky zinc powder particles have become secondary particles, it is possible to easily disintegrate the secondary particles into primary particles by a simple mixing operation. Then, the secondary particles can be disintegrated into primary particles in such a manner that flaky zinc powder particles are not broken into fine pieces or the film is not damaged.

Water repellency of flaky zinc powder particles exists because the surfaces are covered with the hydrophobic group of a silane compound, and when a flaky zinc powder is put into pure water, it floats on the water. However, when a surfactant is added to water, it is possible to disperse flaky zinc powder particles in water.

Although the film of a silane compound having a hydrophobic group which covers the surfaces of flaky zinc powder particles is very thin, the film can prevent the reaction which generates hydrogen, when the surfaces of flaky zinc powder particles become contact with water or moist air. Furthermore, this film can effectively prevent the reaction which generates hydrogen when flaky zinc powder particles are dispersed in an aqueous binder solution of a water reducible rust inhibitive paint for metals containing a surfactant.

Because a water reducible rust inhibitive paint for metals is prepared by dispersing a flaky zinc powder, which is subjected to surface treatment by a silane compound having a hydrophobic group, in an aqueous binder solution containing a surfactant, the particles of a flaky zinc powder in a water reducible rust inhibitive paint for metals is dispersed substantially in the state of primary particles in an aqueous binder solution, and it is possible to form a chromium-free rust inhibitive paint film excellent in rust inhibitive performance even with small thickness. Also, after a water reducible rust inhibitive paint is formed, it is possible to prevent the paint form degrading in association with the reaction between an aqueous binder solution and a flaky zinc powder, which may generate hydrogen bubbles.

When the surfaces of fasteners such as bolts and nuts are painted by the dip-spin coating method with a rust inhibitive paint containing a flaky zinc powder, which is substantially formed of primary particles dispersed in an aqueous binder solution, a paint film structure is formed in which the particles of a flaky zinc powder overlap each other in a condition shifted parallel to each other, and a paint film in which the substrate is covered with multilayer flaky zinc powder particles is obtained. Thus, a thin paint film of sufficiently excellent rust inhibitive performance can be formed.

As a silane compound having a hydrophobic group to be added on the surface of flaky zinc powder particles, a silane compound having a hydrophobic group and an alkoxy group, such as a silane coupling agent, may be used. When a silane compound is dissolved in alcohol solvent and a small amount of water is added together with acetic acid and the like as a catalyst, the hydrolysis of the alkoxy group occurs and a hydroxyl group is formed in the place where the alkoxy group was present.

When an alcoholic solution of this hydrolyzed silane compound is mixed into a flaky zinc powder slurry dispersed in the alcohol solvent, the silane compound having a hydrophobic group is added to the particle surfaces of a flaky zinc powder and covers all the surfaces of the flaky zinc powder particles, and the flaky zinc powder exhibits water repellency.

To convert a granular zinc powder into a flaky zinc, the zinc powder slurry is usually subjected to bead mill processing. In this case, a commercially available granular zinc powder having an average particle size of 3 to 6 $\mu$m is used as the raw material and subjected to bead mill processing to make a flaky zinc powder. Specifically, a zinc powder is mixed into an organic solvent which is inexpensive and inactive, such as mineral spirit, to form a slurry, and this slurry is fed to a bead mill process, where the particles of the zinc powder are struck and stretched into flaky particles by the impacts generated when zirconia beads approximately 0.5 mm in diameter hit each other. In making a flaky zinc powder, a fatty acid and a higher alcohol may be dissolved in the slurry of zinc powder for use as a lubricant.

By mixing a paste of flaky aluminum powder into a slurry of a zinc powder and subjecting the slurry to bead mill processing to make a flaky zinc powder, a flaky zinc powder in which a flaky aluminum powder is closely mixed can be obtained. The mixing of a flaky aluminum paste into a slurry of a zinc powder may be performed after the bead mill processing.

After the bead mill processing to make a flaky zinc powder, the mineral sprit which is a medium of the zinc powder slurry is substituted for by an alcohol solvent suitable for the surface treatment with a silane compound. Ethyl alcohol, isopropyl alcohol, n-butyl alcohol, ethyl Cellosolve, butyl Cellosolve, 1-methoxy-2-propanol, methyl alcohol, etc. can be used as the alcohol solvent.

In adding a silane compound to the surfaces of flaky zinc powder particles, it is possible to adopt a usual method which involves adding a silane coupling agent to the surfaces of inorganic powder particles.

After the addition of a silane compound to the surfaces of flaky zinc powder particles, it is preferred to remove the alcohol solvent used in the addition treatment as much as possible. Because an excessive silane compound remains in the alcohol, the excessive silane compound can be removed by the removal of the alcohol. Then, the dried flaky zinc powder does not form secondary particles or can be recovered as a flaky zinc powder ready to be disintegrated into primary particles. After removing the supernatant alcohol solvent containing a residual silane compound by decantation, it is advisable to transfer the flaky zinc powder wetted with the alcohol onto a sheet which absorbs liquids, such as filter paper. If the alcohol solvent is absorbed by filter paper, it is easy to dry the flaky zinc powder. Because the silane compound added to the surfaces of flaky zinc powder particles cannot be removed even by rinsing with alcohols, it can also be dried after rinsing with a low boiling point alcohol which dries easily.

The alcohol solvent may be evaporated by being left to stand in a room. However, in order to dry the alcohol solvent perfectly, it is possible to put the wet powder in a heated drier and dry. Alternatively, the wet powder is transferred into a vessel under a reduced pressure while it is hot and alcohol is evaporated under the reduced pressure.

As for dipropylene glycol and the like contained in the aluminum paste, because the mineral spirit is substituted for by an alcohol solvent and drying is performed finally after removing the supernatant alcohol solvent, a dried flaky zinc powder obtained does not substantially contain dipropylene glycol and the like.

In this manner, it is ensured that flaky zinc powder particles are prevented from coalescing together strongly to form secondary particles, and the obtained dried flaky zinc powder having water repellency is formed of primary particles or secondary particles ready to be disintegrated into primary particles. That is, a flaky zinc powder, which is mixed and stirred in an aqueous binder solution after drying, is substantially dispersed as primary particles.

Although the flaky zinc powder to which a silane compound having a hydrophobic group is added exhibits water repellency, it can be dispersed in a water reducible binder solution by adding a surfactant.

In a chromium-free water reducible rust inhibitive paint for metals according to the present invention, a flaky zinc powder is dispersed substantially as primary particles in the water reducible rust inhibitive paint for metals. Therefore, when an article is painted with this paint, a paint film is formed in such a manner that the particles of a flaky zinc powder overlap each other and shift parallel to each other so as to cover the surface of the article without generating voids and traces of bubbles (hydrogen bubble holes). Therefore, even when fasteners are painted with a relatively thin paint film of about 10 $\mu$m or less, the paint film exhibits excellent rust inhibitive performance.

A chromium-free water reducible rust inhibitive paint of the present invention exhibits good rust inhibitive performance when steel products are painted. To paint the surfaces of small steel products such as bolts and nuts with the water reducible rust inhibitive paint, the dip-spin coating method followed by baking is usually adopted. For example, steel products such as bolts are degreased and sand-blasted beforehand, the steel products are put in a cage of metal netting and immersed in a paint liquid. After pulling up the cage, an excessive paint adhering to the substrate surface is removed by centrifugal force by rotating the cage and the painted products are baked at about 250° C. after drying. Usually, this coating operation is repeated twice so as to paint the whole surface of the products with the paint film. For some shaped and large-sized of products, painting can be performed by brush, spraying, a roll coater, etc. instead of the dip-spin coating method. It is preferred that a thin coating of chromium-free surface treatment agent is formed in thickness of 1 to 3 μm on a paint film in order to further improve the rust inhibitive performance of the paint film.

The chromium-free surface treatment agent used in the present invention contains, as a main component, alkoxysilane oligomer (hereinafter abbreviated as "silane oligomer") of weight averaged molecular weight (Mw) of 1000 to 10000, which is obtained by the hydrolytic condensation polymerization of alkoxysilane by use of alcohol as a solvent. When rust inhibitive paint films formed on metal products are top-coated with this surface treatment agent, it is possible to form rust inhibitive paint films capable of preventing not only red rusting, but also white rusting and black rusting for a long time. Although tetraalkoxysilane and alkyltrialkoxysilane can be used as the alkoxysilane, tetraalkoxysilane is preferably used. It is preferred that the alkoxy group and alkyl group of alkoxysilane have a carbon number of not more than 3, and such alkoxysilanes are less expensive. The degree of polymerization of the silane oligomer should be rather high and it is more preferred that the weight averaged molecular weight (Mw) is not less than 1500. When the weight averaged molecular weight is smaller than 1500, white rusting occurs a little earlier. Because a silane oligomer having a large weight averaged molecular weight makes the agent unstable (the surface treatment agent is liable to gel), it is more preferred that the weight averaged molecular weight is not more than 9000. The measurement of the weight averaged molecular weight is performed by gel-permeation chromatography. It is preferred that the amount of silane oligomer blended in the surface treatment agent is 8 to 25% by weight as an amount converted to a silica component. A thick coating is formed when a surface treatment agent containing a large amount of silane oligomer is applied, and a thin coating is formed when a surface treatment agent containing a small amount of silane oligomer is applied. When the coating is thin, the effect of the application of a surface treatment agent is poor. When the coating is thick, the cost of application of a surface treatment agent increases and the adhesion of the coating is impaired. The coating thickness of an applied surface treatment agent is preferably 1 to 3 μm and more preferably 1.5 to 2.5 μm.

A chromium-free surface treatment agent preferably contains a dispersed nano-sized powder of titanium dioxide formed of primary particles having an average particle size of not more than 70 nm. The blending of a nano-sized powder of titanium dioxide improves the rust inhibitive performance of a surface treatment agent. When the concentration of silane oligomer is the same, a coating formed by applying a surface treatment agent in which a nano-sized powder of titanium dioxide is suspended has a larger coating thickness than a coating formed by applying a surface treatment agent in which a nano-sized powder of titanium dioxide is not suspended. The blending of a nano-sized powder of titanium dioxide in a surface treatment agent is effective also in adjusting the coefficient of friction of the coating surface.

The average particle size of a nano-sized powder of titanium dioxide is preferably not more than 70 nm and more preferably not more than 40 nm. The nano-sized powder particles of titanium dioxide in the form of primary particles having a mean particle size of one order of magnitude smaller than the wavelength of a visible light ray do not scatter visible light rays while the particles dispersed within a coating film in the state of primary particles, and the film is clear and colorless.

The blending of an effective amount of nano-sized powder of titanium dioxide is effective in enhancing the rust inhibitive effect of a surface treatment agent. The amount of blended nano-sized powder of titanium dioxide suspended in a surface treatment agent is preferably 3 to 25 parts by weight and more preferably 5 to 20 parts by weight per 100 parts by weight of the silica component of silane oligomer. If the blended amount is too small, the effect on the enhancement of rust inhibitive performance cannot be obtained. If the blended amount is too large, an applied coating becomes thick and colors white, resulting in a higher cost of surface treatment.

Usually, an alcoholic solution of silane oligomer contains a low boiling point alcohol as a main component. Therefore, when the humidity in a room is high, the low boiling point alcohol evaporates during the application of a surface treatment agent and takes the heat of evaporation away, as dew formation occurs. In order to prevent degradation of an applied coating by wetting with formed dew, it is preferred to mix 5 to 35% by weight of a high boiling alcohol in a surface treatment agent having a boiling point higher than 115° C., such as ethyl Cellosolve, n-butyl alcohol, butyl Cellosolve, propylene glycol monomethyl ether and propylene glycol monoethyl ether. In this case, it is advisable to mix a nano-sized powder of titanium dioxide into a high boiling point alcohol to form slurry, and the slurry is subjected to dispersion treatment by a bead mill or a ball mill, and the dispersed slurry of nano-sized powder of titanium dioxide is mixed into a surface treatment agent.

A resin component capable of dissolving in alcohol, such as polyvinyl butyral and phenol resin, can be added as a sub-component to a surface treatment agent. The addition of a resin component increases the viscosity of a surface treatment agent and increases the thickness of a coating film. In this case, in order to improve the adhesion of a coating film to a substrate, it is desirable to use a silane coupling agent in combination. The addition of these sub-components to a surface treatment agent is effective in improving rust inhibitive performance.

In painting metal products with a chromium-free water reducible rust inhibitive paint for metals which uses a flaky metallic zinc powder containing a flaky metallic aluminum powder as a rust inhibitive pigment, 4 to 10 μm thick paint films can be formed by one dip-spin painting followed by baking, and paint films having double thickness can be formed by repeating the dip-spin painting and baking twice. For example, when a surface treatment agent is applied to a painted metal product with a chromium-free water reducible rust inhibitive paint for metals in a thickness of about 10 μm, and this metal product, along with a metal product painted only with a rust inhibitive paint, is placed in a salt spray testing machine to investigate rust inhibitive performance. It is found that the duration until red rusting occurs can be prolonged twice or more by applying a surface treatment agent which contains, as a main component, silane oligomer having weight averaged molecular weight of 1000 to 10000. It is preferred that the baking temperature of a chromium-free water reducible rust inhibitive paint for metals be selected between 230 to 330° C. and that the baking temperature of a chromium-free surface treatment agent be selected between 180 to 250° C. A rust inhibitive paint and a surface treatment agent can be applied to large-size metal products by spraying, and in this case it is desirable to lower the concentration by diluting.

Although steel products and cast iron products are mentioned as principal metal products to apply rust inhibitive paint, the same rust inhibitive effect can be expected so long as they are products of metals having ionization tendency close to that of iron and smaller than that of zinc.

Although the present invention will be specifically described by the following examples, the invention is not limited to these examples.

EXAMPLE 1

A slurry was obtained by mixing 3 kg of mineral spirit (ROUS from Sanyo Kasei Co., Ltd.), 233g of aluminum paste (which contains 70% by weight of flaky aluminum powder, 20% by weight of mineral spirit and 10% by weight of dipropylene glycol) and 18 g of stearic acid to 1 kg of metallic zinc powder having an average particle size of 4 $\mu$m (F-3000 from Honjo Chemical Co., Ltd.), and this slurry was fed from a service tank to a bead mill, where the zinc powder was processed to make a flaky zinc powder.

A bead mill machine SC100/32A from Mitsui Mining Co., Ltd. was used and about 0.65 kg of zirconia beads having a diameter of 0.5 mm was charged into a grinding chamber of the bead mill. The rotor of the bead mill was rotated at 2650 RPM (peripheral speed of the rotor: about 14 m/second) and the slurry was circulated for about 2 hours between the bead mill and the service tank. The zinc powder slurry processed to make a flaky zinc powder was transferred to a mixer (FM20BX type Henschel mixer from Mitsui Mining Co., Ltd.) equipped with a reduced pressure vessel, which was provided with a stirrer, and a heater and the slurry was dried under a reduced pressure, and a dried flaky zinc powder was recovered. As the surfaces of the flaky particles of this zinc powder were covered with a film of stearic acid, the particles had become secondary particles due to the presence of stearic acid having adhesion and it was difficult to disintegrate the secondary particles into primary particles. Therefore, by use of a jet mill (N-CONDUX Type CGS16 from Mitsui Mining Co., Ltd.) the secondary particles were disintegrated into primary particles, which were classified by a cyclone and a flaky metallic zinc powder was recovered. When this flaky metallic zinc powder, which has water repellency, was put into water, it floated on the water surface.

This flaky zinc powder (containing 14% by weight of flaky aluminum powder) was blended with other components to obtain the following composition, and a chromium-free water reducible rust inhibitive paint for metals was obtained.

| | |
|---|---|
| Flaky zinc powder | 100 parts by weight |
| (containing a flaky aluminum powder) | |
| Stearic acid | 1.8 parts by weight |
| Water reducible epoxy resin emulsion | 3 parts by weight |
| γ-glycidoxypropyl trimethoxysilane | 46 parts by weight |
| Dipropylene glycol | 85.8 parts by weight |
| Nonionic natural alcohol ethoxylate | 2.8 parts by weight |
| Boric acid | 2.8 parts by weight |
| Water | 85.8 parts by weight |

In the above composition, the water reducible epoxy resin emulsion is a product of Dainippon Ink And Chemicals, Inc. Because this water reducible epoxy resin emulsion contains 20% by weight of resin component, 3 parts by weight correspond to 0.6 part by weight in terms of a resin component. γ-glycidoxypropyl trimethoxysilane is a water soluble silane coupling agent having an epoxy functional group (TSL8350, effective component: 100 parts by weight) from GE Toshiba Silicones, and nonionic natural alcohol ethoxylate is a surfactant having an HLB value of 12.9 made by Asahi Denka Co., Ltd. The amount of water includes the water of the water reducible resin emulsion and this applies to the descriptions which will be given below.

When this rust inhibitive paint was left to stand for a while, small hydrogen bubbles were generated, little, and an increase in the viscosity of the paint was observed when several days elapsed. The cause of this phenomenon was supposed as follows. That is, part of the zinc surface of flaky zinc powder particles is exposed when the flaky zinc particles are broken into fine pieces or the coated particle surfaces are damaged, and this zinc surface reacts with the aqueous binder solution to form small hydrogen bubbles.

The paint was blended and slow stirring was continued for 24 hours. After that, about 30 mm long M8 (8 mm diameter) bolts were painted with this water reducible rust inhibitive paint by the dip-spin coating method (radius of rotation of metal netting cage: 150 mm, rotation speed: 340 RPM) and the rust inhibitive paint film was baked at 250° C. for 15 minutes. This operation was repeated twice and 20 bolts painted with the rust inhibitive paint were obtained.

Subsequently, an alcoholic solution of silane oligomer (which contains silane oligomer of weight averaged molecular weight (Mw) of about 2240, which is obtained by the hydrolytic condensation polymerization of tetraethoxysilane, has a pH of about 3 and contains about 20% by weight of silica component; this silane oligomer being hereinafter referred to as "silane oligomer 1") as a surface treatment agent was applied to ten out of these 20 bolts painted with the rust inhibitive paint by the dip-spin coating method and the coated surface treatment agent was baked at 180° C. for 15 minutes. The thickness of a rust inhibitive paint film obtained after the same operation was repeated twice was about 16 $\mu$m and the thickness of the coating of the surface treatment agent applied to this paint film was 1 to 2 $\mu$m or so. When micrographs of paint film sections were investigated, many laminated secondary particles of flaky zinc powders were observed. The paint film thickness was nonuniform, clearances were present between the laminated secondary particles of flaky zinc powder, and a paint film structure having holes considered to be the traces of hydrogen bubbles were observed. The weight averaged molecular weight of the silane oligomer was determined by use of the gel-permeation chromatograph HLC-8120GPC of Tosoh Corporation by using tetrahydrofuran as a solvent and preparing calibration curves with polystyrene standards.

EXAMPLE 2

During the preparation of the flaky zinc powder described in EXAMPLE 1, a flaky zinc powder covered with stearic acid (containing 17.4% by weight of flaky aluminum powder) was prepared by increasing the aluminum paste to be mixed into the zinc powder slurry to 301 g. This flaky zinc powder was blended with other components to obtain the following composition, and a water reducible rust inhibitive paint for metals was obtained.

| | |
|---|---|
| Flaky zinc powder | 100 parts by weight |
| (containing a flaky aluminum powder) | |
| Stearic acid | 1.8 parts by weight |
| Water reducible block isocyanate resin emulsion | 2.7 parts by weight |
| β-(3,4-epoxycyclohexyl)ethyl triethoxysilane | 11.5 parts by weight |
| Polyethylene glycol (molecular weight: about 1000) | 58.4 parts by weight |

| | |
|---|---|
| Nonionic natural alcohol ethoxylate | 2.8 parts by weight |
| Sodium molybdate | 1.4 parts by weight |
| Water | 106 parts by weight |

The above water reducible block isocyanate resin emulsion is Prominate (containing 45% by weight of solid resin component) from Ganz Chemical Co., Ltd. and 2.7 parts by weight correspond to 1.2 parts by weight in terms of a resin component. β-(3,4-epoxycyclohexyl)ethyl triethoxysilane is Coatsil 1770 from Nippon Unicar Co., Ltd. The polyethylene glycol having a molecular weight of about 1000 was a solid at room temperature and exhibited deliquenscence.

When 24 hours elapsed after the formation of the paint, about 30 mm long M8 bolts were painted by the dip-spin coating method (radius of rotation of metal netting cage: 150 mm, rotation speed: 340 RPM) and the rust inhibitive paint film was baked at 250° C. for 15 minutes. This operation was repeated twice and 20 rust inhibitive painted bolts were obtained. Subsequently, an alcoholic solution of silane oligomer (which contains silane oligomer of weight averaged molecular weight (Mw) of about 8070, which is obtained by the hydrolytic condensation polymerization of tetraethoxysilane, has a pH of about 4 and contains about 10% by weight of silica component; this silane oligomer being hereinafter referred to as "silane oligomer 2") as a surface treatment agent was applied to ten out of these 20 rust inhibitive painted bolts by the dip-spin coating method and baking at 180° C. was performed for 15 minutes. The thickness of the paint film of the rust inhibitive paint obtained at this time was about 15 μm and the thickness of the coating of the surface treatment agent was 1 μm or so. When micrographs of paint film sections were investigated, many laminated secondary particles of flaky zinc powders were observed. The paint film thickness was nonuniform, clearances were present between the laminated secondary particles of flaky zinc powder, and a paint film structure having holes considered to be the traces of small hydrogen bubbles were observed.

EXAMPLE 3

During the preparation of the flaky zinc powder described in EXAMPLE 1, a zinc powder slurry was made by dissolving 18 g of lauryl alcohol in place of stearic acid in mineral spirit. After the bead mill processing, the zinc powder slurry was dried under a reduced pressure to make a dried flaky zinc powder and disintegrated into primary particles by use of the jet mill, whereby a flaky zinc powder coated with lauryl alcohol was prepared. This flaky zinc powder was blended with other components to obtain the following composition, and a water reducible rust inhibitive paint for metals was obtained.

| | |
|---|---|
| Flaky zinc powder (containing a flaky aluminum powder) | 100 parts by weight |
| Lauryl alcohol | 1.8 parts by weight |
| Water reducible block isocyanate resin emulsion | 1.84 parts by weight |
| β-(3,4-epoxycyclohexyl)ethyl triethoxysilane | 55.3 parts by weight |
| Polyethylene glycol (molecular weight: about 1000) | 85.8 parts by weight |
| Nonionic natural alcohol ethoxylate | 2.8 parts by weight |
| Sodium molybdate | 1.4 parts by weight |
| Water | 85.8 parts by weight |

The above water reducible block isocyanate resin emulsion is the same as used in EXAMPLE 2 and 1.84 parts by weight correspond to 0.83 parts by weight in terms of a resin component.

When 24 hours elapsed after the formation of a rust inhibitive paint, about 30 mm long M8 bolts were painted with this water reducible rust inhibitive paint by the dip-spin coating method (radius of rotation of metal netting cage: 150 mm, rotation speed: 340 RPM) and the rust inhibitive paint film was baked at 250° C. for 15 minutes. This operation was repeated twice and 20 rust inhibitive painted bolts were obtained. Subsequently, a surface treatment agent which was obtained by mixing 15 parts by weight of ethyl Cellosolve into 65 parts by weight of alcoholic solution of silane oligomer 1 was applied to ten out of these 20 rust inhibitive painted bolts by the dip-spin coating method and the coated surface treatment agent was baked at 180° C. for 15 minutes. The thickness of the paint film of the rust inhibitive paint obtained at this time was about 16 μm and the thickness of the coating of the surface treatment agent was 1 μm or so. When micrographs of paint film sections were investigated, many laminated secondary particles of flaky zinc powders were observed. The paint film thickness was nonuniform, clearances were present between the laminated secondary particles of flaky zinc powder, and a paint film structure having holes considered to be the traces of small hydrogen bubbles were observed.

EXAMPLE 4

In the same manner as the preparation of the flaky zinc powder in EXAMPLE 3, a flaky zinc powder which was disintegrated into primary particles after drying was obtained. A water reducible rust inhibitive paint for metals was obtained utilizing this flaky zinc powder in the same manner as in EXAMPLE 3 with the exception that 2.8 parts by weight of boric acid were added in place of sodium molybdate.

When 24 hours elapsed, about 30 mm long M8 bolts were painted with this water reducible rust inhibitive paint for metals by the dip-spin coating method (radius of rotation of metal netting cage: 150 mm, rotation speed: 340 RPM) and the rust inhibitive paint film was baked at 250° C. for 15 minutes. This operation was performed once and 20 rust inhibitive painted bolts were obtained. On the other hand, a nano-sized powder of titanium dioxide (Tainock A-100 from Taki Chemical Co., Ltd., average particle size of primary particles: about 8 nm, specific surface area: about 300 m²/g) was mixed into ethyl Cellosolve to obtain a slurry having a concentration of 16.7% by weight, which was dispersed for 24 hours in a ball mill in which zirconia balls having a diameter of 5 mm and a diameter of 3 mm are mixed at a weight ratio of 1:1, whereby a dispersed slurry of a nano-sized powder of titanium dioxide was obtained. A surface treatment agent was obtained by mixing 8 parts by weight of this dispersed slurry into 80 parts by weight of alcoholic solution of silane oligomer 1. Subsequently, the surface treatment agent was applied to ten out of the above 20 rust inhibitive painted bolts by the dip-spin coating method and the coated surface treatment agent was baked at 180° C. for 15 minutes. The thickness of the paint film of the rust inhibitive paint obtained at this time was about 8 μm and the thickness of the coated surface treatment agent was a little smaller than 2 μm. When micrographs of paint film sections were investigated, many laminated secondary particles of flaky zinc powders were observed. The paint film thickness was nonuniform, clearances were present between the laminated secondary particles of flaky zinc powder, and a paint film structure having holes considered to be the traces of small hydrogen bubbles were observed.

EXAMPLE 5

A slurry was obtained by mixing 3 kg of mineral spirit (ROUS from Sanyo Kasei Co., Ltd.), 233g of aluminum paste (which contains 70% by weight of flaky aluminum powder, 20% by weight of mineral spirit and 10% by weight of dipropylene glycol) and 18 g of lauryl alcohol to 1 kg of zinc powder having an average particle size of 4 μm (F-3000 from Honjo Chemical Co., Ltd.), and this zinc powder slurry was fed from a service tank to a bead mill, where the metallic zinc powder was processed to make a flaky zinc powder. The same bead mill as in EXAMPLE 1 was used and processed to make a flaky zinc powder under the same conditions as in EXAMPLE 1.

The processed slurry of a flaky zinc powder was transferred into a stainless steel container, where the slurry was left stand for a while. The flaky zinc powder having a high specific gravity (a mixture containing a flaky metallic aluminum powder, the same condition applies to descriptions made below) settled on the bottom of the container and a clear supernatant of mineral spirit was formed. This supernatant was removed by use of decantation or a siphon and substituted by butyl Cellosolve to obtain a butyl Cellosolve slurry of the flaky zinc powder. Separately, a silane monomer solution was prepared by adding 30 g of 2% aqueous water solution of acetic acid and 130 g of n-hexyl trimethoxysilane (AZ-6177 from Nippon Unicar Co., Ltd.) to 600 g of butyl Cellosolve, holding the temperature at about 50° C. while stirring the mixture, and hydrolizing the methoxy group of silnae monomer. The obtained silane monomer solution was added little by little continually for 5 hours to a butyl Cellosolve slurry of a flaky zinc powder held at 55° C., while the slurry was kept stirring overnight.

Then the slurry was left to stand, whereby the flaky metallic zinc powder was caused to settle on the bottom of the container, and a supernatant was removed again by use of decantation or a siphon. The wet flaky zinc powder cake was transferred onto filter paper laid on an aluminum tray, and spread out, the butyl Cellosolve was caused to be absorbed into the filter paper, and drying was performed in that state in a room a whole day and night. The flaky zinc powder was put in a drier and dried at 120° C. for several hours. In this manner, a dry flaky zinc powder which does not substantially contain lauryl alcohol was obtained.

When the dry flaky zinc powder was put into water and the water was stirred, the dried flaky metallic zinc powder repelled water and floated on the water surface. This dried flaky metallic zinc powder was blended with other components to obtain the following composition, and a chromium-free water reducible rust inhibitive paint for metals was obtained.

| | |
|---|---|
| Flaky zinc powder (containing a flaky aluminum powder) | 100 parts by weight |
| Water reducible block isocyanate resin emulsion | 1.84 parts by weight |
| β-(3,4-epoxycyclohexyl)ethyl triethoxysilane | 55.3 parts by weight |
| Polyethylene glycol (molecular weight: about 1000) | 85.8 parts by weight |
| Nonionic natural alcohol ethoxylate | 2.8 parts by weight |
| Boric acid | 2.8 parts by weight |
| Water | 85.8 parts by weight |

The above water reducible block isocyanate resin emulsion is the same as used in EXAMPLE 2 and 1.84 parts by weight correspond to 0.83 parts by weight in terms of a resin component.

The flaky zinc powder disperses without forming secondary particles in a water reducible binder solution to which a surfactant (nonionic natural alcohol ethoxylate) is added, and the water reducible metal rust inhibitive paint does not generate hydrogen bubbles and is stable in viscosity with time.

In the same manner as in EXAMPLE 1, 20 M8 bolts were painted with this rust inhibitive paint by the dip-spin coating method and the rust inhibitive paint film was baked at 250° C. for 15 minutes. This operation was repeated twice. Subsequently, the same surface treatment agent as in EXAMPLE 4 was applied to ten out of the 20 rust inhibitive painted bolts and baked at 180° C. for 15 minutes. At this time, the thickness of the paint film was about 12 μm and the thickness of the coating of the surface treatment agent was a little smaller than 2 μm. When micrographs of paint film sections were investigated, laminated secondary particles of flaky zinc powder particles were not observed in the paint film, and there was observed a paint film structure in which flaky zinc powder dispersed in the state of primary particles were aligned in a condition shifted each other in the direction parallel to the substrate surface so as to cover the substrate surface in multiple layers.

FIG. 1 schematically shows the section of a paint film structure related to the present invention. In FIG. 1, the numeral 2 denotes an about 11 μm thick paint film formed on the surface of a substrate (bolt) 1. A thin hardened layer of water reducible binder is present among primary particles 4 of a flaky zinc powder and bonds the primary particles 4 of the flaky zinc powder together. The numeral 3 denotes a coating of a surface treatment agent formed on the paint film.

EXAMPLE 6

A dry flaky zinc powder was made in the same manner as in EXAMPLE 5, and a rust inhibitive paint was prepared in the same manner as in EXAMPLE 5 with the exception that 1.4 parts by weight of sodium molybdate were added in place of boric acid. The obtained rust inhibitive paint did not generate hydrogen bubbles and the viscosity changed little with time. In the same manner as in EXAMPLE 1, 20 M8 bolts were painted with this rust inhibitive paint by the dip-spin coating method and the rust inhibitive paint film was baked at 250° C. for 15 minutes. This operation was repeated twice.

A nano-sized powder of titanium dioxide (Super Titania F-6 from Showa Denko K.K., average particle size of primary particles: about 15 nm, specific surface area: 100 $m^2/g$) was mixed into ethyl Cellosolve and a slurry having a concentration of 16.7% by weight was obtained. In the same manner as in Example 5, this slurry was dispersed for 24 hours in a ball mill and a dispersed slurry of the nano-sized titanium dioxide powder was obtained. A surface treatment agent was obtained by mixing 8 parts by weight of this dispersed slurry into 80 parts by weight of an alcoholic solution of silane oligomer 2. Subsequently, the surface treatment agent was applied to ten out of the above-described 20 rust inhibitive painted bolts by the dip-spin coating method and baked at 180° C. for 15 minutes. When micrographs of paint film sections were investigated, the thickness of the obtained paint film of the rust inhibitive paint was about 11 μm and the thickness of the coating of the surface treatment agent was about 1 μm. A flaky zinc powder in the state of laminated secondary particles was not observed in the paint film, and there was observed a paint film structure in which flaky zinc powder particles dispersed in the state of primary particles were aligned in a condition shifted each other in the direction parallel to the substrate surface so as to cover the substrate surface in multiple layers. The paint film structure was almost the same as that shown in FIG. 1.

EXAMPLE 7

A rust inhibitive paint was prepared in the same manner as in EXAMPLE 6, 20 M8 bolts were painted with this rust inhibitive paint by the dip-spin coating method, and the rust inhibitive paint film was baked at 250° C. This operation was repeated twice. A nano-sized powder of titanium dioxide (Super Titania F-6 from Showa Denko K.K.) was mixed into ethyl Cellosolve and a slurry having a concentration of 16.7% by weight was obtained. In the same manner as in Example 5, this slurry was dispersed for 24 hours in a ball mill and a dispersed slurry of nano-sized titanium dioxide powder was obtained. A surface treatment agent was obtained by mixing 8 parts by weight of this dispersed slurry into 80 parts by weight of an alcoholic solution of silane oligomer 1. The surface treatment agent was applied to ten out of the above-described 20 rust inhibitive painted bolts by the dip-spin coating method and baked at 180° C. for 15 minutes. The thickness of the paint film of the rust inhibitive paint obtained at this time was about 12 μm and the thickness of the coating of the surface treatment agent was a little smaller than 2 μm. When micrographs of paint film sections were investigated, there was observed a layered structure in which the dispersed primary particles of a flaky zinc powder were aligned in a condition shifted each other and substantially parallel to the substrate surface. The paint film structure was almost the same as that shown in FIG. 1.

EXAMPLE 8

A rust inhibitive paint was prepared in the same manner as in EXAMPLE 6, 20 M8 bolts were painted with the rust inhibitive paint by the dip-spin coating method and were baked at 250° C. for 15 minutes. This operation was performed once. The same surface treatment agent as used in EXAMPLE 7 was applied to the rust inhibitive painted bolts by the dip-spin coating method and baked at 180° C. for 15 minutes. The thickness of the paint film of the rust inhibitive paint obtained at this time was about 6 μm and the thickness of the coating of the surface treatment agent was a little smaller than 2 μm. When micrographs of paint film sections were investigated, there was observed a layered structure in which the primary particles of a flaky zinc powder were aligned in a condition shifted each other parallel to the substrate surface, in the same manner as in FIG. 1.

EXAMPLE 9

A rust inhibitive paint was prepared in the same manner as in EXAMPLE 6, 20 M8 bolts were painted with this rust inhibitive paint by the dip-spin coating method and were baked at 250° C. for 15 minutes. This operation was repeated twice. A nano-sized powder of titanium dioxide (Super Titania F-6 from Showa Denko K.K.) was mixed into 1-methoxy-2-propanol (also called propylene glycol monomethyl ether) and a slurry having a concentration of 16.7% by weight was obtained. This slurry was mixed in a ball mill for 24 hours. A surface treatment agent was obtained by mixing 8 parts by weight of this dispersed slurry into 80 parts by weight of an alcoholic solution of silane oligomer 1. The surface treatment agent was applied to the rust inhibitive painted bolts by the dip-spin coating method and the bolts were baked at 180° C. for 15 minutes. This operation was repeated twice. The thickness of the paint film of the rust inhibitive paint obtained at this time was about 12 μm and the thickness of the coating of the surface treatment agent was a little smaller than 2 μm. When micrographs of paint film sections were investigated, there was observed a layered film structure in which the dispersed primary particles of a flaky zinc powder were aligned in a condition shifted each other in the direction parallel to the substrate surface, in the same manner as in FIG. 1.

EXAMPLE 10

During the preparation of the flaky zinc powder described in EXAMPLE 5, a dry flaky zinc powder was prepared by increasing the content of flaky aluminum powder to 35% by weight. This dry flaky zinc powder was blended with other components to obtain the following composition, and a rust inhibitive paint was prepared. The obtained rust inhibitive paint did not generate hydrogen bubbles and the viscosity changes little with time.

| | |
|---|---|
| Flaky zinc powder (containing a flaky aluminum powder) | 100 parts by weight |
| Water reducible block isocyanate resin emulsion | 1.84 parts by weight |
| β-(3,4-epoxycyclohexyl)ethyl triethoxysilane | 67 parts by weight |
| Polyethylene glycol (molecular weight: about 1000) | 33 parts by weight |
| Nonionic natural alcohol ethoxylate | 6.7 parts by weight |
| Carboxymethyl cellulose (thickener) | 0.6 parts by weight |
| Sodium molybdate | 1.0 parts by weight |
| Water | 75.7 parts by weight |

The above water reducible block isocyanate resin emulsion is the same as used in EXAMPLE 2 and 1.84 parts by weight correspond to 0.83 parts by weight in terms of a resin component.

Twenty M8 bolts were painted with this rust inhibitive paint by the dip-spin coating method and were baked at 250° C. for 15 minutes (this operation was performed only once). A surface treatment agent of the following composition was prepared by mixing silane oligomer 1, the dispersed slurry of nano-sized titanium dioxide powder prepared in EXAMPLE 7, a polyvinyl butyral resin (BM-1 from Sekisui Chemical Co., Ltd.), ethyl Cellosolve and a silane coupling agent (γ-glycidoxypropyl trimethoxysilane), and was applied to ten out of these rust inhibitive painted bolts by the dip-spin coating method and the surface treated bolts were baked at 180° C. for 15 minutes.

The composition of this surface treatment agent is as follows.

| | |
|---|---|
| Alcoholic solution of silane oligomer 1 | 65 parts by weight |
| Ethyl Cellosolve | 16.2 parts by weight |

| -continued | |
|---|---|
| Silane coupling agent | 5 parts by weight |
| Polyvinyl butyral resin | 0.5 parts by weight |
| Nano-sized titanium dioxide powder | 1.33 parts by weight |

In preparing the surface treatment agent, a 10% by weight polyvinyl butyral resin solution in ethyl Cellosolve was used.

The thickness of the paint film of the rust inhibitive paint at this time was about 10 μm and the thickness of the coating of the surface treatment agent was a little smaller than 2 μm. When micrographs of paint film sections were investigated, there was observed a layered film structure in which the primary particles of a flaky zinc powder were aligned in a condition shifted each other in the direction parallel to the substrate surface, in the same manner as in FIG. 1.

EXAMPLE 11

A rust inhibitive paint was prepared in the same manner as in EXAMPLE 6, 20 M8 bolts were painted with this rust inhibitive paint by the dip-spin coating method and the bolts were baked at 250° C. for 15 minutes. This operation was repeated twice. The surface treatment agent prepared in EXAMPLE 10 was applied to ten out of these 20 rust inhibitive painted M8 bolts by the dip-spin coating method and the bolts were baked at 180° C. for 15 minutes.

The thickness of the paint film was about 12 μm and the thickness of the coating of the surface treatment agent was a little smaller than 2 μm. When the micrographs of paint film sections were investigated, there was observed a layered film structure in which the primary particles of a flaky zinc powder were aligned in a condition shifted each other in the direction parallel to the substrate surface, in the same manner as in FIG. 1.

EXAMPLE 12

A rust inhibitive paint of the same composition as in EXAMPLE 6 was prepared, 20 M8 bolts were painted with this rust inhibitive paint by the dip-spin coating method and were baked at 250° C. for 15 minutes. This operation was repeated twice. A nano-sized powder of titanium dioxide (Super Titania F-6 from Showa Denko K.K.) was mixed into ion-exchanged pure water to obtain a slurry having a concentration of 16.7% by weight, and the slurry was dispersed in a ball mill for 24 hours in the same manner as in EXAMPLE 5. A surface treatment agent was obtained by mixing 8% by weight of this dispersed slurry into 80% by weight of Snow-Tex XS of Nissan Chemical Industries, Ltd. (containing about 20% by weight of silica component as water reducible colloidal silica) and adding 3 drops (about 0.07 part by weight) of Dynol 604 (a wetting agent of Nisshin Chemical Industry Co., Ltd.). This surface treatment agent was applied to ten out of these 20 rust inhibitive painted M8 bolts by the dip-spin coating method and the bolts were baked at 180° C. for 15 minutes.

The thickness of the paint film was about 12 μm and the thickness of the coating was a little smaller than 2 μm. When the micrograph of rust inhibitive paint film section was investigated, the paint film structure was almost the same as that shown in FIG. 1.

EXAMPLE 13

A rust inhibitive paint of the same composition as in EXAMPLE 10 was prepared, and 20 M8 bolts were painted with this rust inhibitive paint by the dip-spin coating method, and were baked at 250° C. for 15 minutes (this operation was performed only once). Then, a nano-sized powder of titanium dioxide (Super Titania F-6 from Showa Denko K.K.) was mixed into ion-exchanged pure water to obtain a slurry having a concentration of 16.7% by weight, and this slurry was dispersed in a ball mill for 24 hours in the same manner as in EXAMPLE 5. By mixing 8 part by weight of this dispersed slurry into 80 part by weight of Snow-Tex XS of Nissan Chemical Industries, Ltd. and adding 3 drops (about 0.07 part by weight) of Dynol 604, a surface treatment agent was obtained. This surface treatment agent was applied to ten out of these 20 rust inhibitive painted M8 bolts by the dip-spin coating method and the bolts were baked at 180° C. for 15 minutes. The rust inhibitive paint film was investigated by their micrographs. The thickness of the paint film was about 11 μm and the thickness of the coating was a little smaller than 2 μm. When the micrographs of paint film sections were investigated, the paint film structure was almost the same as that shown in FIG. 1.

EXAMPLE 14

A slurry was obtained by mixing 4 kg of mineral spirit (ROUS made by Sanyo Kasei Co., Ltd.), 100 g of aluminum paste (by Showa Aluminum Powder Co., Ltd., which contains 20% of mineral spirit and 10% of dipropylene glycol) and 20 g of lauryl alcohol (KALCOL 2098 from Kao Corporation) per kg of zinc powder having an average particle size of about 4 μm (F-3000 from Honjo Chemical Co., Ltd.), and this slurry was processed to make a slurry of flaky zinc powder.

The SC 100/32A mill from Mitsui Mining Co., Ltd. was used as the bead mill and about 0.65 kg of zirconia beads having a diameter of 0.5 mm was charged into a grinding chamber of the bead mill. While the rotor of the bead mill was being rotated at 2650 RPM (corresponding to a peripheral speed of about 14 m/second), the zinc powder slurry put into the service tank was fed to the bead mill and circulated between the bead mill and the service tank. The processing time, which depends on the amount of slurry put into the service tank, was about 2 hours when a slurry containing 1 kg of zinc powder was processed.

The mineral spirit slurry of flaked zinc powder was transferred to a stainless steel container, where 54 g of aluminum paste was added and the slurry was fully mixed and then left to stand for a while. The flaky zinc powder having a high specific gravity (containing 9.7% by weight of flaky aluminum powder) was settled down in the container to form a supernatant of mineral spirit. This supernatant was removed by decantation or sucking with a siphon and substituted by butyl Cellosolve to obtain a butyl Cellosolve slurry of the flaky zinc powder.

Separately, by adding 30 g of a 2% aqueous acetic acid solution and 130 g of n-octyl trimethoxysilane (silane monomer A-137 from Nippon Unicar Co., Ltd.) to 600 g of butyl Cellosolve, and holding at about 50° C. for 3 hours while stirring the mixture, a solution of a silane monomer having a hydrophobic group and hydrolized alkoxy groups was prepared.

The hydrolyzed silane monomer solution was added little by little into the slurry held at about 55° C. for 5 hours, and the slurry was left to stand overnight while being stirred.

The stirring was stopped and the slurry was left to stand, whereby the flaky zinc powder was caused to settle down in the container, and a supernatant was removed again by decantation or sucking with a siphon. The wet flaky zinc powder cake was spread out on a filter paper laid in an aluminum tray, the butyl Cellosolve was absorbed by the filter paper, and the powder was dried in that state in a room all day long. The flaky zinc powder cake was put in a drier kept at 120° C. for several hours.

The obtained dry flaky zinc powder had a good metal luster. A small amount of the dry flaky zinc powder was picked up and dropped on a water surface. All the powder had water repellency and floated on the water surface even when the water was stirred.

A hundred parts by weight of this flaky zinc powder thus silanated (including 9.7% by weight of aluminum powder) were mixed in this state into a water reducible binder solution, which consists of 2.7 parts by weight of water reducible block isocyanate resin emulsion (Prominate made by Ganz Chemical Co., Ltd., which contains 45% by weight of resin component), 11.5 parts by weight of β(3,4-epoxycyclohexyl) ethyl triethoxysilane (Coatsil 1770 made by Nippon Unicar Co., Ltd.), 58.4 parts by weight of polyethylene glycol having an average molecular weight (Mw) of about 1000, 2.8 parts by weight of nonionic natural alcohol ethoxylate (a surfactant from Asahi Denka Co., Ltd.), 1.4 parts by weight of sodium molybdate and 106.2 parts by weight of water, and stirred slowly by use of a stirrer. Thus, a water reducible rust inhibitive paint for metals containing a flaky zinc powder was obtained, and the flaky zinc powder can de dispersed easily in a water reducible binder solution to which a surfactant is added. This water reducible rust inhibitive paint does not generate hydrogen bubbles and has a stable shelf life with only a small change (increase) in viscosity with time.

When 24 hours elapsed after the formation of a paint, about 30 mm long M8 bolts were painted with this water reducible rust inhibitive paint for metals by the dip-spin coating method (radius of rotation: about 150 mm, rotation speed: 340 RPM) and the painted bolts were baked at 250° C. for 15 minutes. This operation was repeated twice and 20 painted bolts were obtained.

Separately, a surface treatment agent was prepared by mixing 8 parts by weight of titanium dioxide slurry (ethyl Cellosolve slurry dispersed for 24 hours in a ball mill) which contains 16.7% by weight of nano-sized powder of titanium dioxide (Super Titania F-6 from Showa Denko K.K., average particle size of primary particles: 15 nm) to 80 parts by weight of alcoholic solution of silane oligomer 1. Subsequently, the surface treatment agent was applied to ten out of these 20 M8 bolts by the dip-spin coating method (radius of rotation of cage: about 150 mm, rotation speed: 350 RPM), and the surface treated bolts were baked at 180° C. for 15 minutes.

The bolts which had been painted and surface-treated were embedded in a resin and cut. When the paint film section was investigated with a 2000-fold micrograph, flaky zinc powder particles were dispersed in the paint film substantially as primary particles in the same manner as shown in FIG. 1. The paint film was about 11 μm in thickness, and the flaky zinc powder particles were aligned in a condition shifted each other in the direction parallel to the substrate surface, thereby forming a paint film in which the flaky zinc powder particles cover the substrate surface in multiple layers. The thickness of the surface-treated coating baked onto the surface of the rust inhibitive paint film was a little smaller than 2μm.

EXAMPLE 15

A silane monomer solution was prepared by dissolving 125 g of phenyl triethoxysilane (TSL-8178 from GE Toshiba Silicones) in place of the n-octyl trimethoxysilane monomer used in EXAMPLE 14 in 600 g of butyl Cellosolve and the alkoxy groups were hydrolyzed by using acetic acid as a catalyst.

Except for the silane monomer solution, a water reducible rust inhibitive paint for metals was made in the same manner as in EXAMPLE 14, and a rust inhibitive paint in which the particles of the flaky zinc powder were dispersed substantially in the state of primary particles was obtained. M8 bolts were painted with this rust inhibitive paint in the same manner as in EXAMPLE 14 by the dip-spin coating method, and 20 painted bolts of EXAMPLE 15 were obtained. The same surface treatment agent as in EXAMPLE 14 was applied to 10 out of these 20 painted bolts by the dip-spin coating method (radius of rotation of the cage: about 150 mm, rotation speed: 350 RPM) and the bolts were baked at 180° C. for 15 minutes. One of the bolts was embedded in a resin and cut. When the paint film section was investigated with a 2000-fold micrograph, a paint film structure in which the dispersed primary particles of a flaky zinc powder were aligned in a condition shifted each other in the direction parallel to the substrate (bolt) surface was observed. This paint film structure is almost the same as shown in FIG. 1 and the paint film thickness on the bolt surface was about 10 μm and the thickness of the coating formed by the surface treatment agent was a little smaller than 2 μm.

COMPARATIVE EXAMPLE 1

The rust inhibitive paint of COMPARATIVE EXAMPLE 1 was prepared in the same manner as in EXAMPLE 1 with the exception that an epoxy resin emulsion was not blended. When this rust inhibitive paint was left to stand for a while, small hydrogen bubbles were generated, and an increase in the viscosity of the paint was observed when several days elapsed.

When about 24 hours elapsed after the formation of the water reducible rust inhibitive paint for metals, 10 M8 bolts about 30 mm in length were painted with this water reducible rust inhibitive paint for metals by the dip-spin coating method (radius of rotation of cage: about 150 mm, rotation speed: 340 RPM) and the bolts were baked at 250° C. for 15 minutes. This operation was repeated twice and the painted bolts of COMPARATIVE EXAMPLE 1 were obtained.

One of the painted bolts was embedded in a resin and cut. When the cut sections of the paint films were investigated with 2000-fold micrographs, there were observed, in the paint film, traces of small bubbles, many secondary particles in which the particles of a flaky zinc powder are laminated, and clearances between the secondary particles. The thickness of the paint films formed on the surfaces of the M8 bolts was not uniform and the average thickness was about 17 μm. When five painted bolts were put in a salt spray testing device, red rusting was observed on the surfaces of three bolts after 920 hours.

COMPARATIVE EXAMPLE 2

The rust inhibitive paint of COMPARATIVE EXAMPLE 2 was prepared in the same manner as in EXAMPLE 1, with the exception that 46.1 parts by weight of silane monomer made by Nippon Unicar Co., Ltd. (A-1230, having water soluble and hydrophilic polyethylene oxide groups) were added in place of γ-glycidoxypropyl trimethoxysilane and that the amount of mixed water was reduced to 60.9 parts by weight. Subsequently, ten M8 bolts were coated with the rust inhibitive paint by the dip-spin coating method and the bolts were baked. The operation was repeated twice. When the paint film section was investigated with 2000-fold micrographs, a paint film structure in which many laminated secondary particles of flaky zinc powder with clearances between the laminated secondary particles and small holes considered to be the traces of hydrogen bubbles was observed. The thickness of the paint films was not uniform The average thickness of the coatings formed on the surfaces of the bolts was about 19 μm. When five painted bolts were put in a salt spray testing device, red rusting was observed on the surfaces of three bolts after 400 hours.

COMPARATIVE EXAMPLE 3

A rust inhibitive paint of the following composition was prepared by using the same flaky zinc powder as used in EXAMPLE 1 (coated with stearic acid and containing 14% by weight of flaky metallic aluminum powder).

| | |
|---|---|
| Flaky zinc powder | 100 parts by weight |
| Stearic acid | 1.8 parts by weight |
| Water reducible epoxy resin emulsion | 19 parts by weight |
| Dipropylene glycol | 85.8 parts by weight |
| Nonionic natural alcohol ethoxylate | 2.8 parts by weight |
| Boric acid | 2.8 parts by weight |
| Water | 85.8 parts by weight |

Because the water reducible epoxy resin emulsion is the same as that used in EXAMPLE 1 and contains 20% by weight of resin component, 19 parts by weight correspond to 3.8 parts by weight in terms of a resin component.

When this rust inhibitive paint was left to stand for a while, small hydrogen bubbles were generated, and an increase in the viscosity of the paint was observed when several days elapsed, in the same manner as in EXAMPLE 1.

When about 24 hours elapsed after the formation of the water reducible rust inhibitive paint for metals, 20 M8 bolts about 30 mm in length were painted with this rust inhibitive paint by the dip-spin coating method (radius of rotation: about 150 mm, rotation speed: 340 RPM) and the bolts were baked at 250° C. for 15 minutes. This operation was repeated twice and the painted bolts of COMPARATIVE EXAMPLE 3 were obtained.

A slurry was obtained by mixing 16.7% by weight of a nano-sized powder of titanium dioxide (Super Titania F-6 from Showa Denko K.K.) was mixed into ethyl Cellosolve, and a slurry containing 16.7% by weight of nano-sized powder of titanium dioxide was obtained. And this slurry was dispersed for 24 hours in a ball mill. A surface treatment agent was obtained by mixing 8 parts by weight of this dispersed slurry into 80 parts by weight of silane oligomer obtained by the hydrolytic condensation polymerization of tetraethoxysilane (which has a weight averaged molecular weight of about 900 and contains about 40% by weight of silicon in terms of a silica component; this silane oligomer being hereinafter referred to as "silane oligomer 3"). The surface treatment agent was applied to ten out of these 20 painted M8 bolts by the dip-spin coating method and the bolts were baked at 180° C. for 15 minutes.

The bolts which had been painted and surface-treated were embedded in a resin and cut. When the cut sections of the paint films were investigated with 2000-fold micrographs, many secondary particles in which the particles of a flaky zinc powder are laminated were observed, and clearances were also observed between the secondary particles. The average thickness of the paint films formed on the surfaces of the M8 bolts was about 17 μm and the thickness of the coatings formed by the surface treatment agent was a little smaller than 2 μm. The thickness of the paint films was not uniform, and traces of small bubbles were observed in the paint films.

Figure 2:
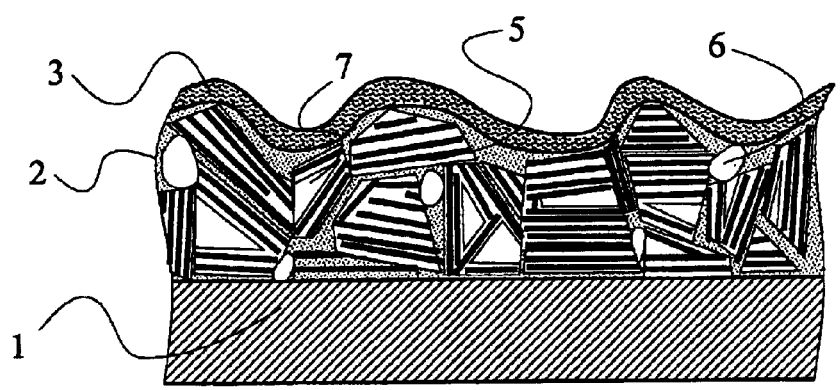
FIG. 2 is a schematic drawing showing the section of a paint film structure which is obtained by painting a water reducible rust inhibitive paint for metals which contains, as a rust inhibitive pigment, a flaky zinc powder which surface is treated with stearic acid, and top-coated with a chromium-free surface treatment agent.

FIG. 2 schematically shows the section of the paint film structure of COMPARATIVE EXAMPLE 3. In FIG. 2, in a paint film 2 on the surface of a substrate (bolt) 1 there are secondary particles 5 in which flaky zinc powders are laminated, and a clearance 7 is observed between the secondary particles and traces of small bubbles 6 are observed in the paint film. It might be thought that the traces of small bubbles 6 are due to hydrogen bubbles generated by reactions.

The compositions of the water reducible rust inhibitive paint for metals and surface treatment agent used in EXAMPLES 1 to 15 and COMPARATIVE EXAMPLES 1 to 3 above are shown in TABLES 1-1 to 1-3 and TABLES 2-1 to 2-3, respectively. The rust inhibitive performance of five M8 bolts painted with a water reducible rust inhibitive paint for metals and five M8 bolts in which a surface treatment agent was applied to a rust inhibitive paint film in EXAMPLES 1 to 15 and COMPARATIVE EXAMPLES 1 to 3 was evaluated by the slat spray test (JIS Z-2371). Because no surface treatment agent was used in COMPARATIVE EXAMPLES 2 and 3, there are blanks in TABLE 2-3 for them. The results of salt spray tests are shown in TABLES 3-1 to 3-3 by the time when white rusting or black rusting was observed in three out of the five bolts and by the time when red rusting was observed in three out of the five bolts.

It is apparent from the results of the salt spray test that metal products painted with a rust inhibitive paint of the present invention were prevented from red rusting for a long time and from white rusting and black rusting to some extent. In EXAMPLES 1 to 3, 5 to 7, 9, 11, 12, 14 and 15 in which a water reducible rust inhibitive paint for metals of the present invention was applied twice by the dip-spin coating method, as is apparent when they are compared with COMPARATIVE EXAMPLES 1 to 3, red rusting is prevented for a long time by applying rust inhibitive paint alone. In addition, application of surface treatment agent containing nano-sized powders of titanium oxide to the paint coating has prevented red rusting still longer. In particular, white rusting and black rusting which occur by the oxidation of metallic zinc were prevented for a long time by top-coating a surface treatment agent containing, as an essential component, an alcohol solution of silane oligomer having a weight averaged molecular weight (Mw) exceeding 1000. The alcohol solution of silane oligomer is obtained by the hydrolytic condensation polymerization of alkoxysilane in an alcoholic solvent, and used as a film forming agent in the surface treatment agent. However, when a water reducible colloidal silica solution was used as an essential component of a surface treatment agent, as shown in EXAMPLE 12 and EXAMPLE 13, white rusting and black rusting appears fast, while red rusting could be prevented for a long time.

TABLE 1-1

| Composition of water reducible rust inhibitive paint for metals (parts by weight) | EXAMPLE | | | | | |
|---|---|---|---|---|---|---|
| | 1 | 2 | 3 | 4 | 5 | 6 |
| Flaky zinc powder | 100 | 100 | 100 | 100 | 100 | 100 |
| Aluminum powder content (wt %) | 14 | 17.4 | 14 | 14 | 14 | 14 |

TABLE 1-1-continued

| Composition of water reducible rust inhibitive paint for metals (parts by weight) | EXAMPLE 1 | 2 | 3 | 4 | 5 | 6 |
|---|---|---|---|---|---|---|
| Surface treatment of zinc powder | | | | | | |
| Lauryl alcohol | | 1.8 | 1.8 | | | |
| Stearic acid | 1.8 | 1.8 | | | | |
| Silane compound | | | | | | |
| n-hexyl trimethoxysilane | | | | | Added | Added |
| n-ocyl trimethoxysilane | | | | | | |
| Phenyl triethoxysilane | | | | | | |
| Treatment to resolve a zinc powder into primary particles Note 1) | Jet | Jet | Jet | Jet | Stir | Stir |
| Water reducible resin emulsion | | | | | | |
| Epoxy resin Note 2) | 0.6 | | | | | |
| Block isocyanate resin Note 2) | | 1.2 | 0.83 | 0.83 | 0.83 | 0.83 |
| Water soluble silane coupling agent | | | | | | |
| γ-glycidoxypropyl trimethoxysilane | 46 | | | | | |
| β-(3,4-epoxycyclohexyl) ethyl triethoxysilane | | 11.5 | 55.3 | 55.3 | 55.3 | 55.3 |
| Silane monomer | | | | | | |

TABLE 1-1-continued

| Composition of water reducible rust inhibitive paint for metals (parts by weight) | EXAMPLE 1 | 2 | 3 | 4 | 5 | 6 |
|---|---|---|---|---|---|---|
| Dipropylene glycol | 85.8 | | | | | |
| Polyethylene glycol | | 58.4 | 85.8 | 85.8 | 85.8 | 85.8 |
| Nonionic natural alcohol ethoxylate | 2.8 | 2.8 | 2.8 | 2.8 | 2.8 | 2.8 |
| Carboxymethyl cellulose | | | | | | |
| Sodium molybdate | | | 1.4 | 1.4 | | 1.4 |
| Boric acid | 2.8 | | | 2.8 | 2.8 | |
| Water | 85.8 | 106 | 85.8 | 85.8 | 85.8 | 85.8 |
| Properties of rust inhibitive paint | | | | | | |
| Generation of hydrogen | Some | Some | Some | Some | None | None |
| Pot life | Poor | Poor | Poor | Poor | Good | Good |

Note 1): "Jet" is an abbreviation for a jet mill. "Stir" is an abbreviation for "Stirring".
Note 2): Amount converted to a resin component

TABLE 1-2

| Composition of water reducible rust inhibitive paint for metals (parts by weight) | EXAMPLE 7 | 8 | 9 | 10 | 11 | 12 |
|---|---|---|---|---|---|---|
| Flaky zinc powder | 100 | 100 | 100 | 100 | 100 | 100 |
| Aluminum powder content (wt %) | 14 | 14 | 14 | 35 | 14 | 14 |
| Surface treatment of zinc powder | | | | | | |
| Lauryl alcohol | | | | | | |
| Stearic acid | | | | | | |
| Silane compound | | | | | | |
| n-hexyl trimethoxysilane | Added | Added | Added | Added | Added | Added |
| n-ocyl trimethoxysilane | | | | | | |
| Phenyl triethoxysilane | | | | | | |
| Treatment to resolve a zinc powder into primary particles Note 1) | Stir | Stir | Stir | Stir | Stir | Stir |
| Water reducible resin emulsion | | | | | | |
| Epoxy resin Note 2) | | | | | | |
| Block isocyanate resin Note 2) | 0.83 | 0.83 | 0.83 | 0.83 | 0.83 | 0.83 |
| Water soluble silane coupling agent | | | | | | |
| γ-glycidoxypropyl trimethoxysilane | | | | | | |
| β-(3,4-epoxycyclohexyl) ethyl triethoxysilane | 55.3 | 55.3 | 55.3 | 67 | 55.3 | 55.3 |
| Silane monomer | | | | | | |
| Dipropylene glycol | | | | | | |

TABLE 1-2-continued

| Composition of water reducible rust inhibitive paint for metals (parts by weight) | EXAMPLE | | | | | |
|---|---|---|---|---|---|---|
| | 7 | 8 | 9 | 10 | 11 | 12 |
| Polyethylene glycol | 85.8 | 85.8 | 85.8 | 33 | 85.8 | 85.8 |
| Nonionic natural alcohol ethoxylate | 2.8 | 2.8 | 2.8 | 6.7 | 2.8 | 6.7 |
| Carboxymethyl cellulose | | | | 0.6 | | |
| Sodium molybdate | 1.4 | 1.4 | 1.4 | 1 | 1.4 | 1.4 |
| Boric acid | | | | | | |
| Water | 85.8 | 85.8 | 85.8 | 75.7 | 85.8 | 85.8 |
| Properties of rust inhibitive paint | | | | | | |
| Generation of hydrogen | None | None | None | None | None | None |
| Pot life | Good | Good | Good | Good | Good | Good |

Note 1): "Jet" is an abbreviation for a jet mill. "Stir" is an abbreviation for "Stirring".
Note 2): Amount converted to a resin component

TABLE 1-3

| Composition of water reducible rust inhibitive paint for metals (parts by weight) | EXAMPLE | | | COMPARATIVE EXPL | | |
|---|---|---|---|---|---|---|
| | 13 | 14 | 15 | 1 | 2 | 3 |
| Flaky zinc powder | 100 | 100 | 100 | 100 | 100 | 100 |
| Aluminum powder content (wt %) | 35 | 9.7 | 9.7 | 14 | 14 | 14 |
| Surface treatment of zinc powder | | | | | | |
| Lauryl alcohol | | | | | | |
| Stearic acid | | | | 1.8 | 1.8 | 1.8 |
| Silane compound | | | | | | |
| n-hexyl trimethoxysilane | Added | | | | | |
| n-ocyl trimethoxysilane | | Added | | | | |
| Phenyl triethoxysilane | | | Added | | | |
| Treatment to resolve a zinc powder into primary particles Note 1) | Stir | Stir | Stir | Jet | Jet | Jet |
| Water reducible resin emulsion | | | | | | |
| Epoxy resin Note 2) | | | | 0 | 0.6 | 3.8 |
| Block isocyanate resin Note 2) | 0.83 | 1.2 | 1.2 | | | |
| Water soluble silane coupling agent | | | | | | |
| γ-glycidoxypropyl trimethoxysilane | | | | 46 | | |
| β-3-(3,4-epoxycyclohexyl) ethyl triethoxysilane | 67 | 11.5 | 11.5 | | | |
| Silane monomer | | | | | 46.1 | |
| Dipropylene glycol | | | | 85.8 | 85.8 | 85.8 |
| Polyethylene glycol | 33 | 58.4 | 58.4 | | | |
| Nonionic natural alcohol ethoxylate | 2.8 | 2.8 | 2.8 | 2.8 | 2.8 | 2.8 |
| Carboxymethyl cellulose | | | | | | |
| Sodium molybdate | 1.4 | 1.4 | 1.4 | | | |
| Boric acid | | | | 2.8 | 2.8 | 2.8 |
| Water | 75.7 | 106.2 | 106.2 | 85.8 | 60.9 | 85.8 |

TABLE 1-3-continued

| Composition of water reducible rust inhibitive paint for metals (parts by weight) | EXAMPLE | | | COMPARATIVE EXPL | | |
|---|---|---|---|---|---|---|
| | 13 | 14 | 15 | 1 | 2 | 3 |
| Properties of rust inhibitive paint | | | | | | |
| Generation of hydrogen | None | None | None | Some | Some | Some |
| Pot life | Good | Good | Good | Poor | Poor | Poor |

Note 1): "Jet" is an abbreviation for a jet mill. "Stir" is an abbreviation for "Stirring".
Note 2): Amount converted to a resin component

TABLE 2-1

| Composition of surface treatment agent (parts by weight) | EXAMPLE | | | | | |
|---|---|---|---|---|---|---|
| | 1 | 2 | 3 | 4 | 5 | 6 |
| Silane oligomer 1 | Note | | 65 | 80 | 80 | |
| Silane oligomer 2 | | Note | | | | 80 |
| Silane oligomer 3 | | | | | | |
| Water reducible colloidal silica | | | | | | |
| Nano-sized powder of titanium dioxide A-100 | | | | 1.33 | 1.33 | |
| Nano-sized powder of titanium dioxide F-6 | | | | | | 1.33 |
| Ethyl Cellosolve | | | 15 | 6.7 | 6.7 | 6.7 |
| 1-methoxy-2-propanol | | | | | | |
| γ-glycidoxypropyl trimethoxysilane | | | | | | |
| Polyvinyl butyral | | | | | | |
| Water (a small amount of Dynol 604 is added.) | | | | | | |

Note: Because the surface treatment agent used in EXAMPLES 1 and 2 each consisted only silane oligomer 1 or silane oligomer 2, the weight ratios are not indicated.

TABLE 2-2

| Composition of surface treatment agent (parts by weight) | EXAMPLE | | | | | |
|---|---|---|---|---|---|---|
| | 7 | 8 | 9 | 10 | 11 | 12 |
| Silane oligomer 1 | 80 | 80 | 80 | 65 | 65 | |
| Silane oligomer 2 | | | | | | |
| Silane oligomer 3 | | | | | | |
| Water reducible colloidal silica | | | | | | 80 |
| Nano-sized powder of titanium dioxide A-100 | | | | | | |
| Nano-sized powder of titanium dioxide F-6 | 1.33 | 1.33 | 1.33 | 1.33 | 1.33 | 1.33 |
| Ethyl Cellosolve | 6.7 | 6.7 | | 16.2 | 16.2 | |
| 1-methoxy-2-propanol | | | 6.7 | | | |
| γ-glycidoxypropyl trimethoxysilane | | | | 5 | 5 | |
| Polyvinyl butyral | | | | 0.5 | 0.5 | |
| Water (a small amount of Dynol 604 is added.) | | | | | | 6.7 |

TABLE 2-3

| Composition of surface treatment agent (parts by weight) | EXAMPLE | | | COMPARATIVE EXMPL | | |
|---|---|---|---|---|---|---|
| | 13 | 14 | 15 | 1 | 2 | 3 |
| Silane oligomer 1 | | 80 | 80 | | | |
| Silane oligomer 2 | | | | | | |
| Silane oligomer 3 | | | | | | 80 |
| Water reducible colloidal silica | 80 | | | | | |
| Nano-sized powder of titanium dioxide A-100 | | | | | | |
| Nano-sized powder of titanium dioxide F-6 | 1.33 | 1.33 | 1.33 | | | 1.33 |
| Ethyl Cellosolve | | 6.7 | 6.7 | | | 6.7 |
| 1-methoxy-2-propanol | | | | | | |
| γ-glycidoxypropyl trimethoxysilane | | | | | | |
| Polyvinyl butyral | | | | | | |
| Water (a small amount of Dynol 604 is added.) | 6.7 | | | | | |

TABLE 3-1

| Rust inhibitive painting and surface treatment | EXAMPLE | | | | | |
|---|---|---|---|---|---|---|
| | 1 | 2 | 3 | 4 | 5 | 6 |
| Rust inhibitive painting | | | | | | |
| Frequency of dip-spin painting | 2 | 2 | 2 | 1 | 2 | 2 |
| Average thickness of rust inhibitive paint film (μm) | 16 | 15 | 16 | 8 | 12 | 11 |
| Film structure | Poor | Poor | Poor | Poor | Good | Good |
| Time of white/black rusting recognized in SST (hrs) | 48 | 48 | 48 | 48 | 48 | 48 |
| Time of red rusting recognized in SST (hrs) | 576 | 554 | 554 | 360 | 1032 | 1032 |
| Application of surface treatment agent | | | | | | |
| Average thickness of surface treated coating (μm) | 1~2 | ~1 | ~1 | <2 | <2 | ~1 |

TABLE 3-1-continued

| Rust inhibitive painting and surface treatment | EXAMPLE | | | | | |
|---|---|---|---|---|---|---|
| | 1 | 2 | 3 | 4 | 5 | 6 |
| Time of white/black rusting recognized in SST (hrs) | 360 | 216 | 264 | 336 | 360 | 264 |
| Time of red rusting recognized in SST (hrs) | 1440 | 1224 | 1248 | 1104 | >2000 | 1992 |

Note:
SST is an abbreviation of salt spray test.

TABLE 3-2

| Rust inhibitive painting and surface treatment | EXAMPLE | | | | | |
|---|---|---|---|---|---|---|
| | 7 | 8 | 9 | 10 | 11 | 12 |
| Rust inhibitive painting | | | | | | |
| Frequency of dip-spin painting | 2 | 1 | 2 | 1 | 2 | 2 |
| Average thickness of rust inhibitive paint film (μm) | 12 | 6 | 12 | 10 | 12 | 12 |
| Film structure | Good | Good | Good | Good | Good | Good |
| Time of white/black rusting recognized in SST (hrs) | 48 | 48 | 48 | 48 | 48 | 48 |
| Time of red rusting recognized in SST (hrs) | 1200 | 504 | 1176 | 768 | 1032 | 1152 |
| Application of surface treatment agent | | | | | | |
| Average thickness of surface-treated coating (μm) | <2 | <2 | <2 | <2 | <2 | <2 |
| Time of white/black rusting recognized in SST (hrs) | 360 | 384 | 360 | 600 | 768 | 96 |
| Time of red rusting recognized in SST (hrs) | 1992 | >2000 | >2000 | 1992 | >2000 | >2000 |

Note:
SST is an abbreviation of salt spray test.

TABLE 3-3

| Rust inhibitive painting and surface treatment | EXAMPLE | | | COMPARATIVE EXMPL | | |
|---|---|---|---|---|---|---|
| | 13 | 14 | 15 | 1 | 2 | 3 |
| Rust inhibitive painting | | | | | | |
| Frequency of dip-spin painting | 1 | 2 | 2 | 2 | 2 | 2 |
| Average thickness of rust inhibitive paint film (μm) | 11 | 11 | 10 | 17 | 19 | 17 |
| Film structure | Good | Good | Good | Poor | Poor | Poor |
| Time of white/black rusting recognized in SST (hrs) | 48 | 45 | 48 | 48 | 48 | 48 |
| Time of red rusting recognized in SST (hrs) | 792 | 1010 | 990 | 920 | 400 | 530 |

TABLE 3-3-continued

| Rust inhibitive painting and surface treatment | EXAMPLE | | | COMPARATIVE EXMPL | | |
|---|---|---|---|---|---|---|
| | 13 | 14 | 15 | 1 | 2 | 3 |
| Application of surface treatment agent | | | | | | |
| Average thickness of surface-treated coating (μm) | <2 | <2 | <2 | | | <2 |
| Time of white/black rusting recognized in SST (hrs) | 72 | 600 | 576 | | | 120 |
| Time of red rusting recognized in SST (hrs) | 1920 | >2000 | >2000 | | | 1248 |

Note:
SST is an abbreviation of salt spray test.

The rust inhibitive performance of a paint film which can be reached depends on various incidental conditions. In particular, by adding a silane compound having a hydrophobic group to the surface of a flaky metallic zinc powder used in a rust inhibitive paint, it is possible to effectively prevent the flaky zinc powder from forming secondary particles and the structure of a rust inhibitive paint film is remarkably improved. As the result, even a thin rust inhibitive paint film can achieve excellent rust inhibitive performance. Further, treating with a surface treatment agent containing nano-sized powers of titanium oxide makes the paint film more rust inhibitive. Also, it is apparent that the treatment with a surface treatment agent which contains, as an essential component, an alcoholic solution of silane oligomer having a specific molecular weight, makes it possible to suppress white rusting for a further long time. By the combined use of a resin, such as polyvinyl butyral, and a silane coupling agent in a surface treatment agent, it is possible to improve adhesion of the coating by the surface treatment agent to the paint film surface. The combined use of a silane coupling agent contributes also to the improvement of the dispersion stability of a nano-sized titanium dioxide powder in a surface treatment agent.

What is claimed is:

1. A chromium-free water reducible rust inhibitive paint for metals, consisting essentially of a water reducible binder solution and 10 to 60% by weight of a flaky zinc powder, part of which is replaced with a flaky aluminum powder effective to improve a rust inhibitive performance of a paint film formed from the chromium-free water reducible rust inhibitive paint for metals, dispersed as a rust inhibitive pigment in the water reducible binder solution, the water reducible binder solution comprising, per 100 parts by weight of the flaky zinc powder, 0.4 to 5 parts by weight of water reducible resin emulsion as an amount converted to a resin component and 2 to 60 parts by weight of a water soluble silane coupling agent.

2. The chromium-free water reducible rust inhibitive paint for metals according to claim 1, wherein the paint consists essentially of the water reducible binder solution and 15 to 55% by weight of the flaky zinc powder and the water reducible binder solution comprises, per 100 parts by weight of the flaky zinc powder, 0.5 to 4.5 parts by weight of the water reducible resin emulsion as an amount converted to the resin component and 2.5 to 55 parts by weight of the water soluble silane coupling agent.

3. The chromium-free water reducible rust inhibitive paint for metals according to claim 2, wherein said water reducible resin emulsion is a water reducible epoxy resin emulsion or a water reducible block isocyanate resin emulsion.

4. The chromium-free water reducible rust inhibitive paint for metals according to claim 2, wherein the water soluble silane coupling agent has a glycidoxy-functional group.

5. The chromium-free water reducible rust inhibitive paint for metals according to claim 2, wherein the water reducible binder solution comprises 8 to 45% by weight of polyethylene glycol, which is solid at ambient temperatures.

6. The chromium-free water reducible rust inhibitive paint for metals according to claim 2, wherein the flaky zinc powder is in a mixture with the flaky aluminum powder containing 5 to 30% by weight of the flaky aluminum powder.

7. The chromium-free water reducible rust inhibitive paint for metals according to claim 2, wherein a silane compound having a hydrophobic group is added to particle surfaces of the flaky zinc powder, whereby the particle surfaces exhibit water repellent property.

8. The chromium-free water reducible rust inhibitive paint for metals according to claim 7, wherein the silane compound to be added to the particle surfaces of the flaky zinc powder has hydroxyl groups, which are generated by hydrolyzing alkoxy groups of a silane compound having both a hydrophobic group and alkoxy groups.

9. The chromium-free water reducible rust inhibitive paint for metals according to claim 7, wherein the water reducible binder solution comprises an effective amount of surfactant capable of dispersing the flaky zinc powder by wetting thereof.

10. A rust inhibitive painted metal product having a paint film on a steel product, the paint film being formed by painting with a chromium-free water reducible rust inhibitive paint for metals, which consists essentially of a water reducible binder solution and 10 to 60% by weight of a flaky zinc powder, part of which is replaced with a flaky aluminum powder effective to improve a rust inhibitive performance of a paint film formed from the chromium-free water reducible rust inhibitive paint for metals, dispersed as a rust inhibitive pigment in the water reducible binder solution, the water reducible binder solution comprising, per 100 parts by weight of the flaky zinc powder, 0.4 to 5 parts by weight of water reducible resin emulsion as an amount converted to a resin component and 2 to 60 parts by weight of a water soluble silane coupling agent.

11. The rust inhibitive painted metal product according to claim 10, wherein the rust inhibitive painted metal product has a top-coating formed by applying to the paint film a chromium-free surface treatment agent which comprises, as an essential component, an alkoxysilane oligomer of weight averaged molecular weight (Mw) of 1000 to 10000, which is obtained by a hydrolytic condensation polymerization of an alkoxysilane using alcohols as a solvent.

12. The rust inhibitive painted metal product according to claim 10, wherein said flaky zinc powder exhibits water repellent properties due to the addition of a silane compound having a hydrophobic group to particle surfaces of the flaky zinc powder and wherein the chromium-free water reducible binder solution comprises an effective amount of surfactant capable of dispersing the flaky zinc powder by wetting thereof.

13. The rust inhibitive painted metal product according to claim 12, wherein the rust inhibitive painted metal product has a top-coating formed by applying to the paint film a chromium-free surface treatment agent which comprises, as an essential component, an alkoxysilane oligomer of weight averaged molecular weight (Mw) of 1000 to 10000, which is obtained by a hydrolytic condensation polymerization of an alkoxysilane using alcohols as a solvent.

14. The rust inhibitive painted metal product according to claim 12, wherein the silane compound having a hydrophobic group to be added to the particle surfaces of the flaky zinc powder has hydroxyl groups, which are generated by hydrolizing alkoxy groups of a silane compound having both a hydrophobic group and alkoxy groups.

15. The rust inhibitive painted metal product according to claim 10, wherein the flaky zinc powder is in a mixture with the flaky aluminum powder containing 5 to 30% by weight of the flaky aluminum powder.

16. The rust inhibitive painted metal product according to claim 11, wherein said chromium-free surface treatment agent comprises dispersed nano-sized powder of titanium dioxide which is formed from primary particles of average particle size of not more than 70 nm, effective to improve rust inhibitive performance.

17. The rust inhibitive painted metal product according to claim 11, wherein the chromium-free surface treatment agent comprises a resin component which is soluble in alcohols, effective to improve rust inhibitive performance.

18. The rust inhibitive painted metal product according to claim 11, wherein the chromium-free surface treatment agent comprises 5% to 35% by weight of alcohols having a boiling point higher than 150° C.

19. The rust inhibitive painted metal product according to claim 11, wherein the chromium-free surface treatment agent comprises 8 to 25% by weight of the alkoxysilane oligomer as an amount converted to a silica component.

20. The rust inhibitive painted metal product according to claim 11, wherein average film thickness of the paint film is 4 to 25 µm and average thickness of top-coating of the chromium-free surface treatment agent is 1 to 3 µm.

* * * * *